United States Patent [19]
Yanagimachi et al.

[11] 3,988,528
[45] Oct. 26, 1976

[54] SIGNAL TRANSMISSION SYSTEM FOR TRANSMITTING A PLURALITY OF INFORMATION SIGNALS THROUGH A PLURALITY OF TRANSMISSION CHANNELS

[75] Inventors: Akio Yanagimachi, Kawasaki; Hisakichi Yamane, Funabashi; Eiichi Sawabe, Machida; Takashi Uehara, Inagi; Takehiko Yoshino, Yokohama; Teruhiro Takezawa, Komae; Michio Masuda, Tokyo; Hiroaki Nabeyama, Yokohama; Masaaki Fukuda, Kodaira; Tatsuo Kayano, Hachioji, all of Japan

[73] Assignees: Nippon Hoso Kyokai; Hitachi, Ltd.; Hitachi Electronics Co., Ltd., all of Tokyo, Japan

[22] Filed: Aug. 27, 1973

[21] Appl. No.: 391,978

[30] Foreign Application Priority Data
Sept. 4, 1972 Japan.............................. 47-88551
Sept. 4, 1972 Japan.............................. 47-88552

[52] U.S. Cl............................ 178/5.6; 178/DIG. 23; 178/5.8 R
[51] Int. Cl.².......................................... H04N 7/08
[58] Field of Search........... 178/DIG. 23, 5.6, 5.8 R, 178/DIG. 3, DIG. 13, DIG. 22; 179/15 BS, 15 BY, 2 TV, 15 AP; 325/39; 360/27, 49, 19

[56] References Cited
UNITED STATES PATENTS

| | | |
|---|---|---|
| 3,087,996 | 4/1963 | Kaneko.................................. 179/15 |
| 3,424,868 | 1/1969 | Saal ...................................... 179/15 |
| 3,652,802 | 3/1972 | Schellenberg.......................... 179/15 |
| 3,740,478 | 6/1973 | Breant et al..................... 179/15 BS |
| 3,772,475 | 11/1973 | Loffreda ............................... 179/15 |
| 3,778,715 | 12/1973 | Schmidt et al......................... 179/15 |
| 3,798,378 | 3/1974 | Epstein ................................. 179/15 |

OTHER PUBLICATIONS

"Two-Way Applications for Cable T.V. Systems in the 70's," IEEE Spectrum, Nov. 1971, pp. 49, 50, By Jurgen.

Primary Examiner—John C. Martin
Attorney, Agent, or Firm—Stevens, Davis, Miller & Mosher

[57] ABSTRACT

A transmission system for transmitting a plurality of information signals having arbitrary time lengths through a plurality of transmission channels, wherein at a transmitter end said plurality of information signals are allotted to said plurality of transmission channels in such a manner that in each transmission channel an information signal is followed by other information signal and a control signal comprising an index of an information composed of one or more information signals, a transmission channel or channels through which said one or more information signals are transmitted and one or more timings of transition of said one or more information signals is transmitted in addition to said information signals and at a receiver end a desired information signal is selectively extracted and reproduced under the control of said control signal.

13 Claims, 26 Drawing Figures

FIG_1
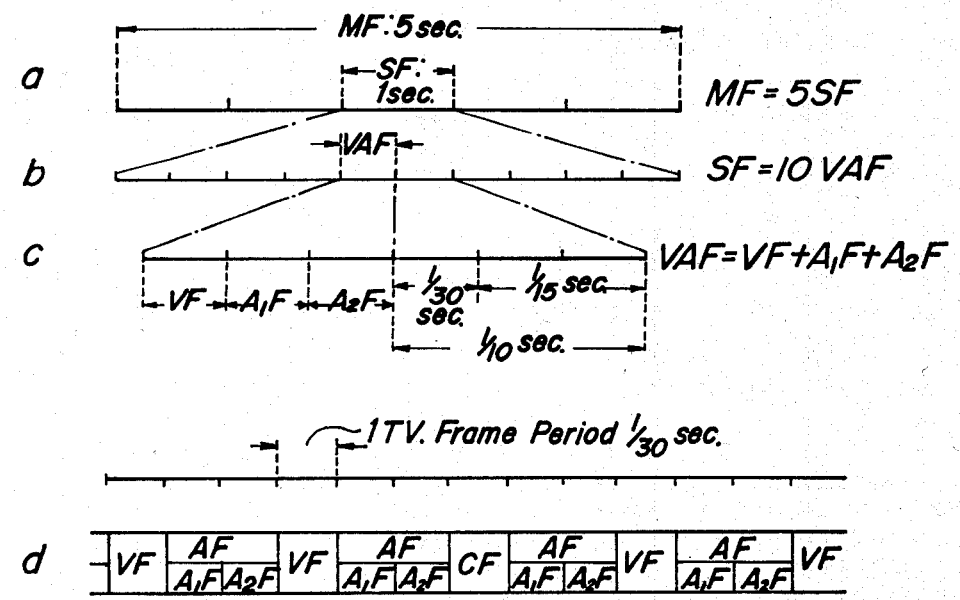
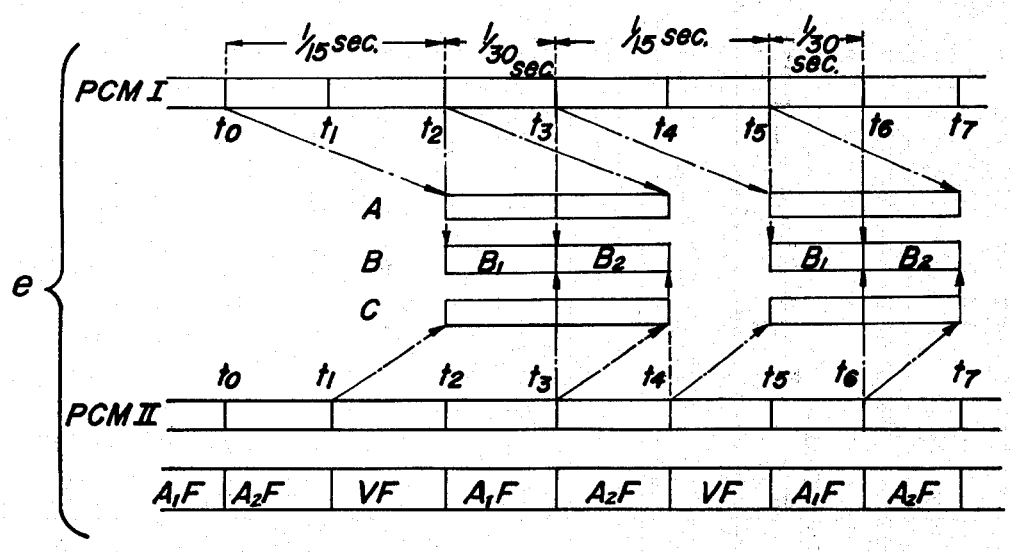

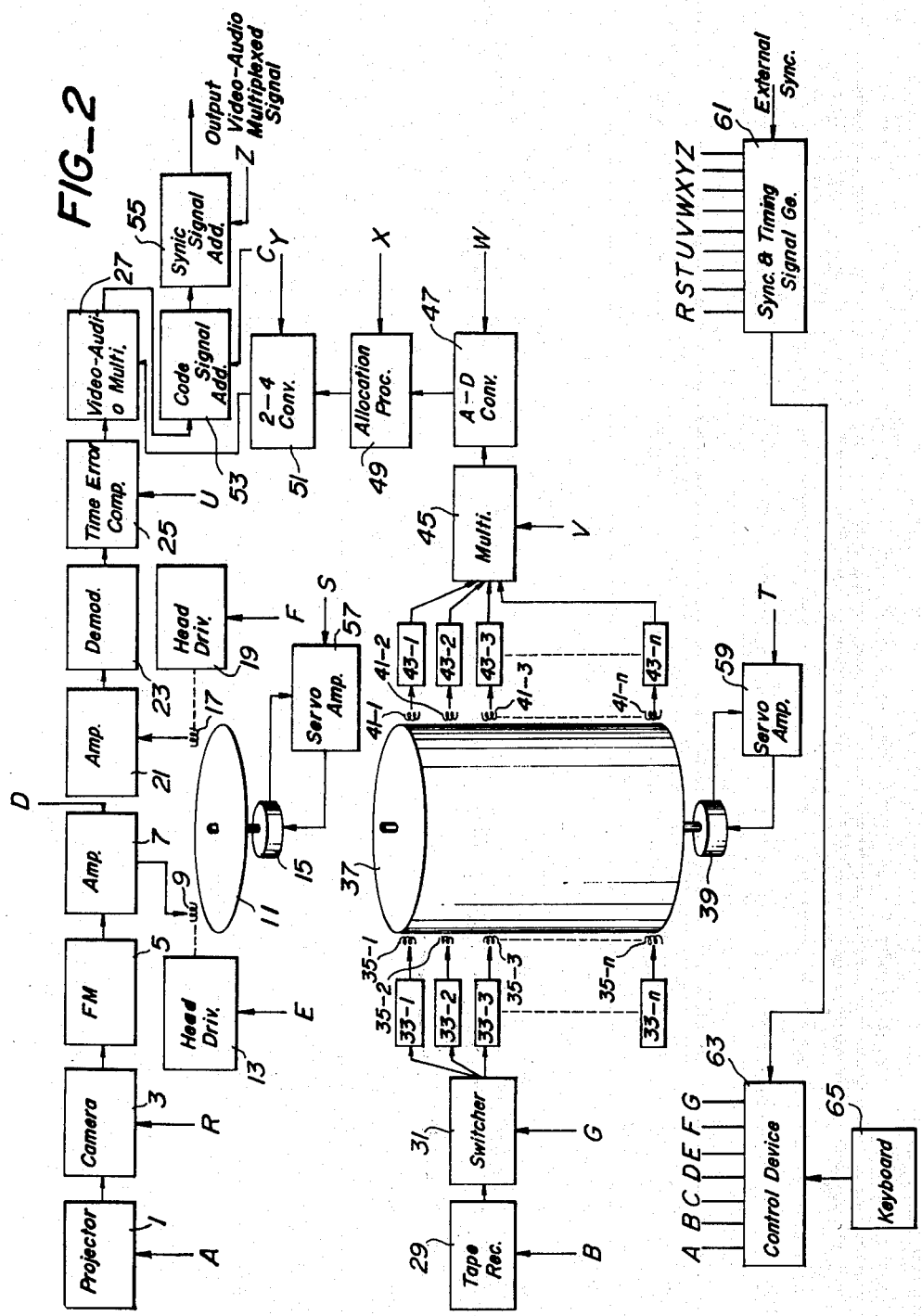

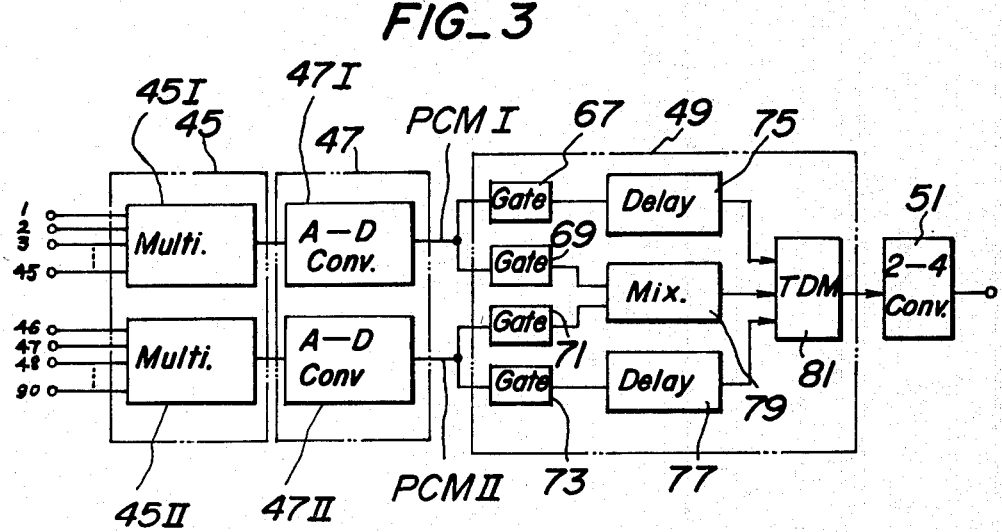
FIG_3
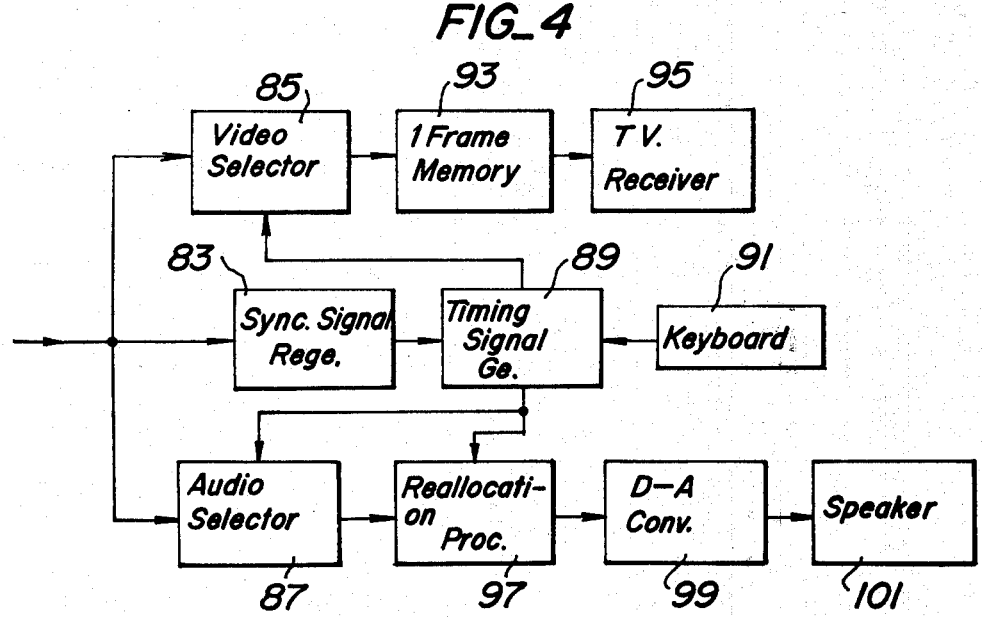
FIG_4

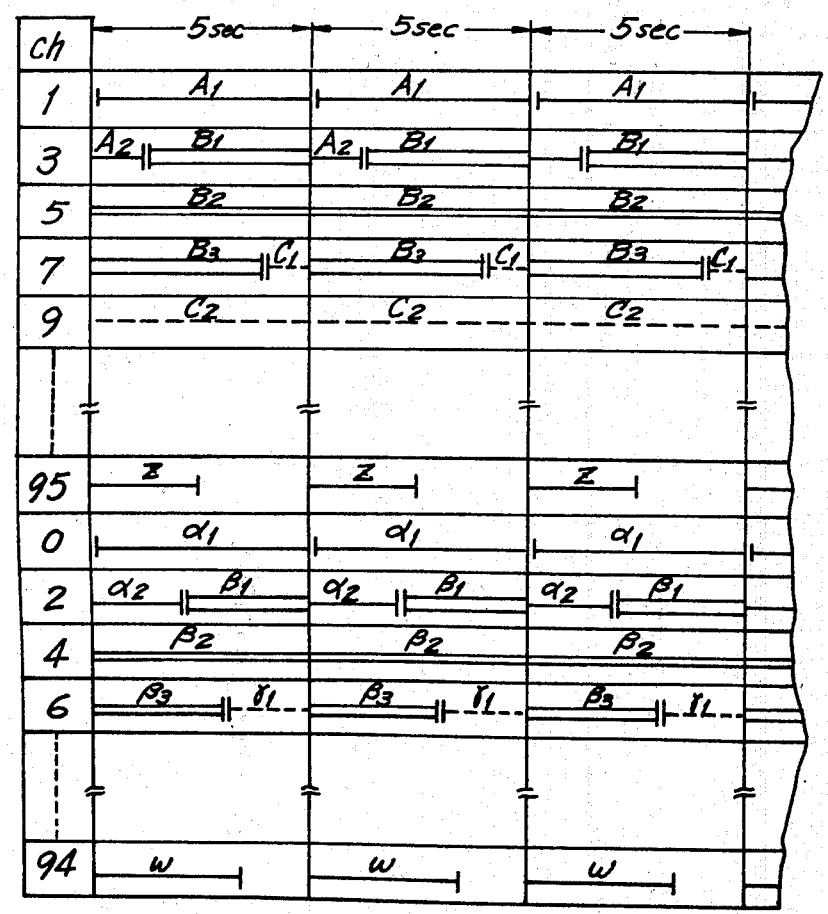

FIG_7
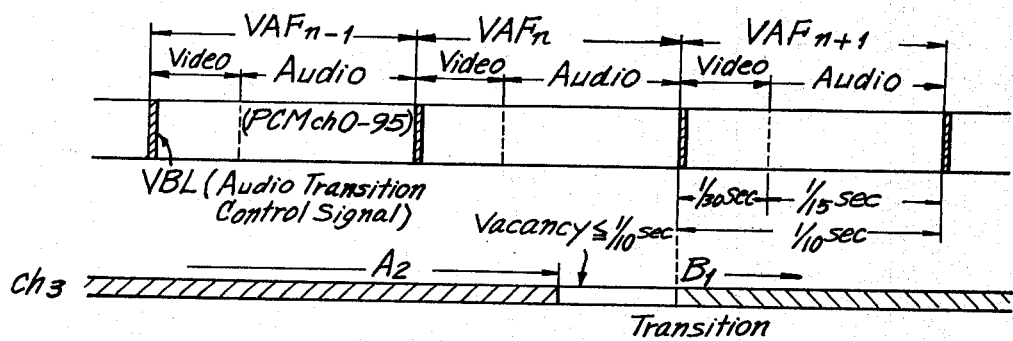
FIG_8
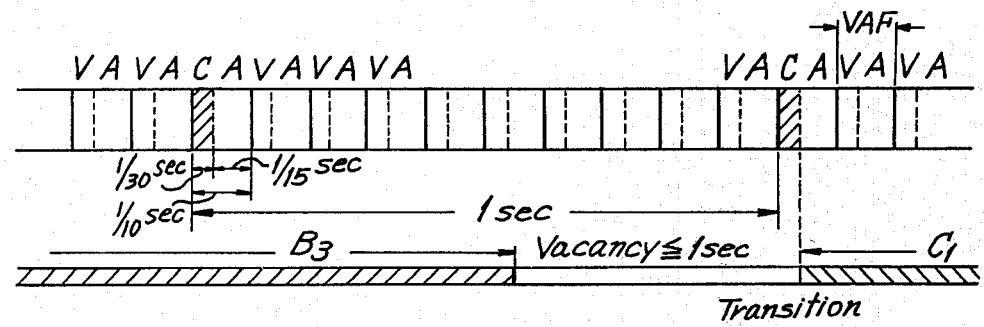
FIG_9
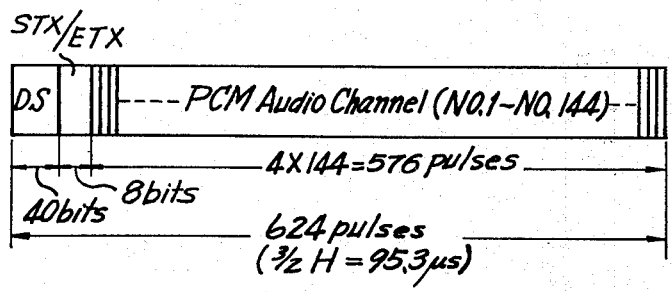

FIG_10
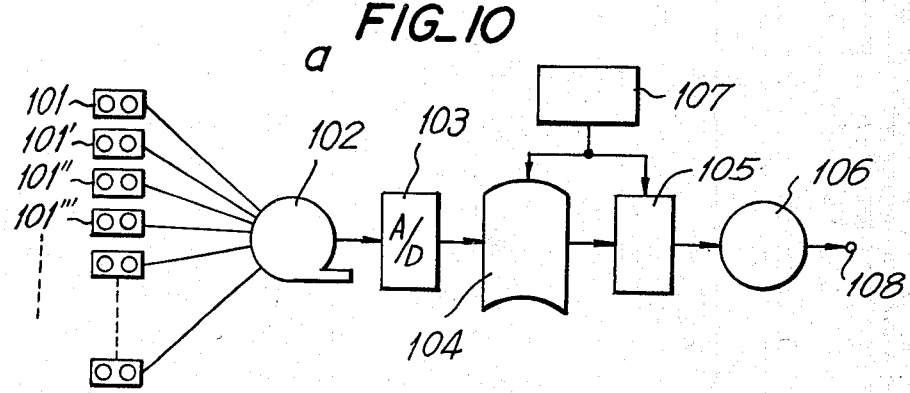
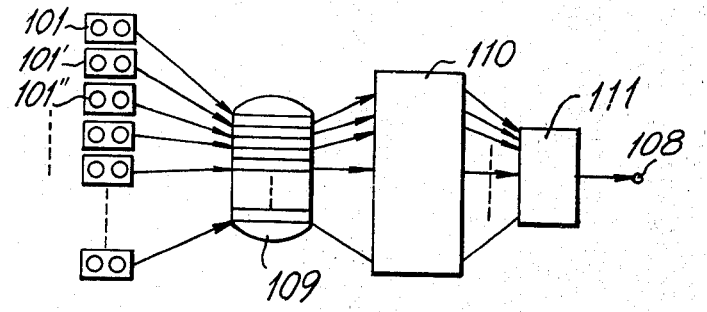

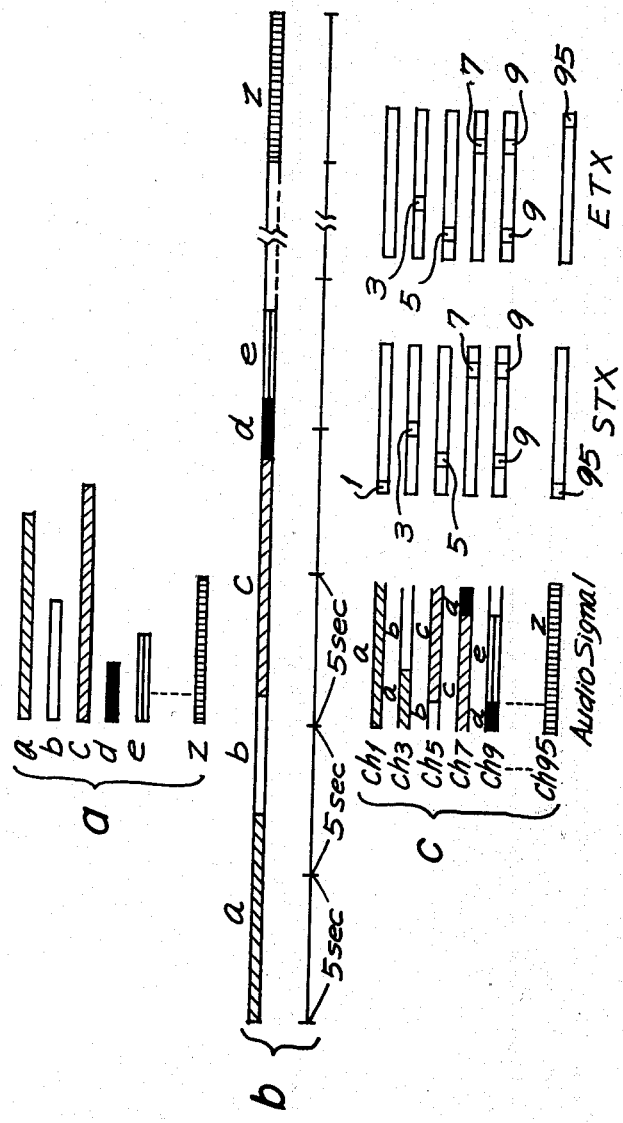

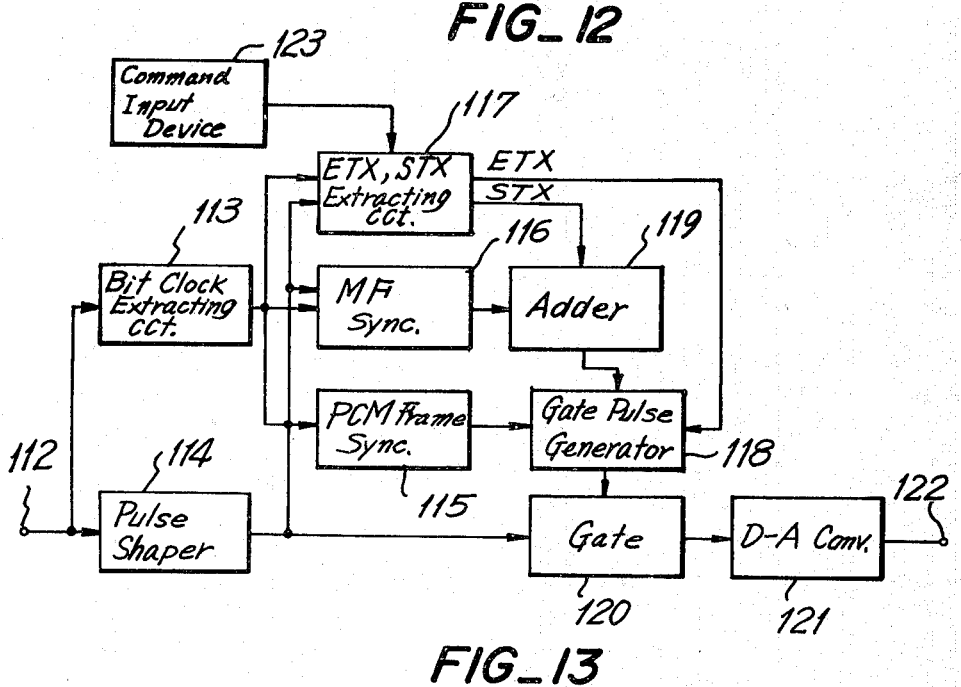
FIG_12
FIG_13

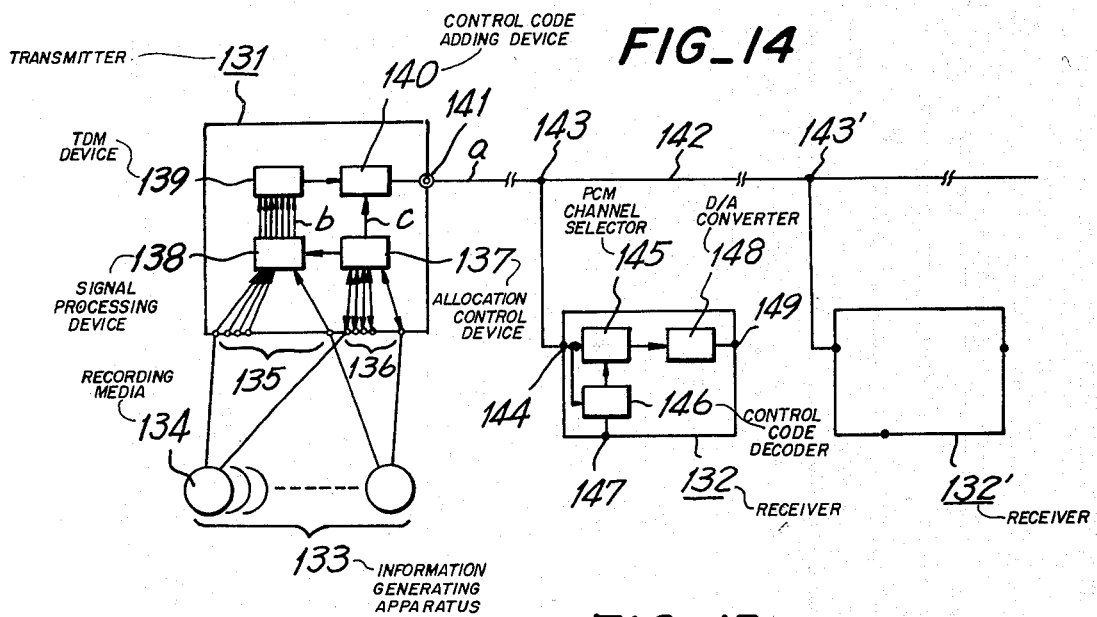
FIG_14
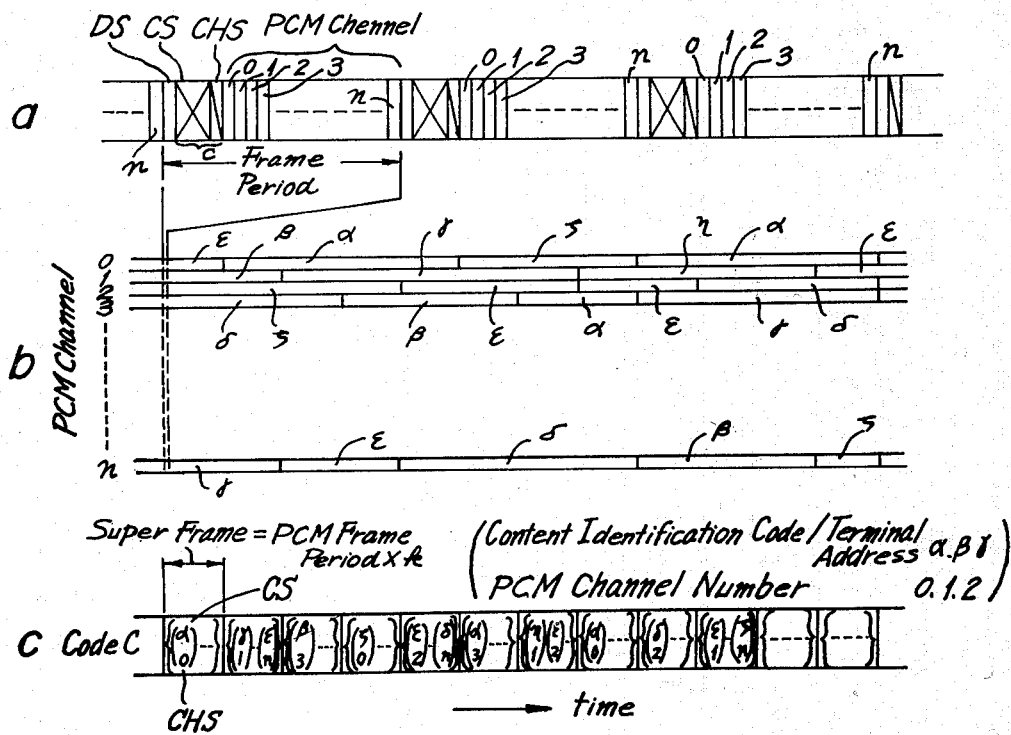
FIG_15

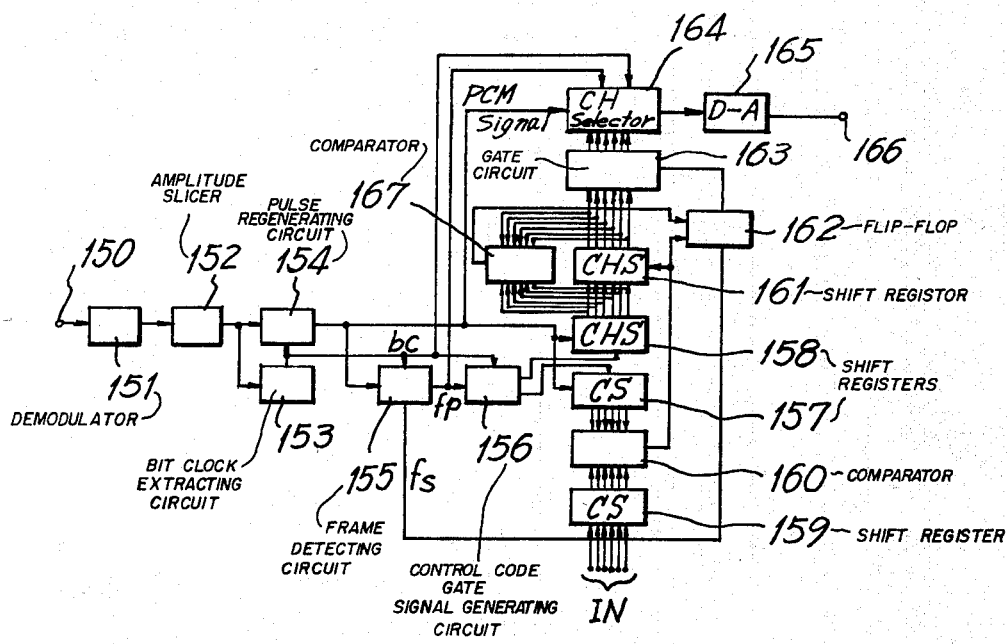
FIG_16

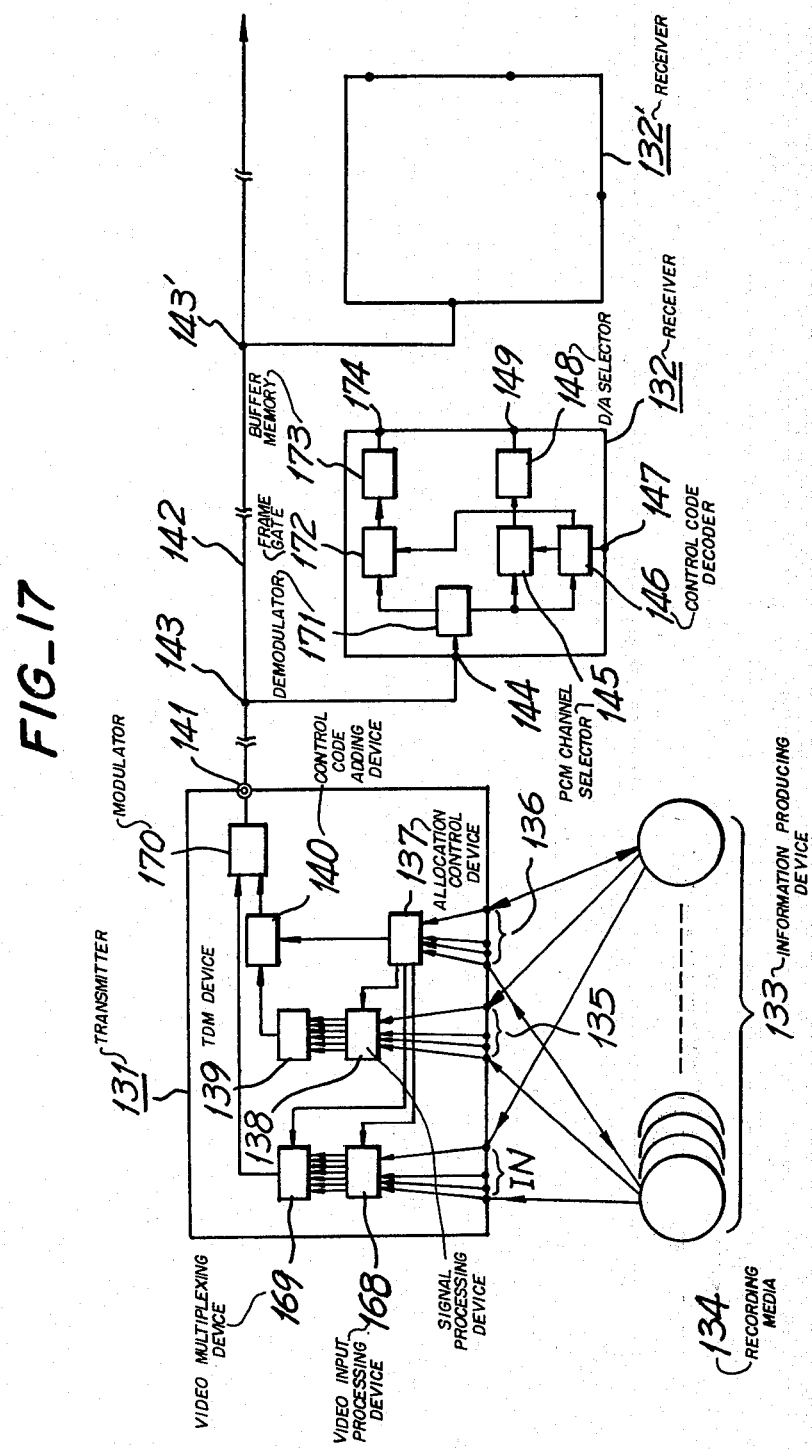

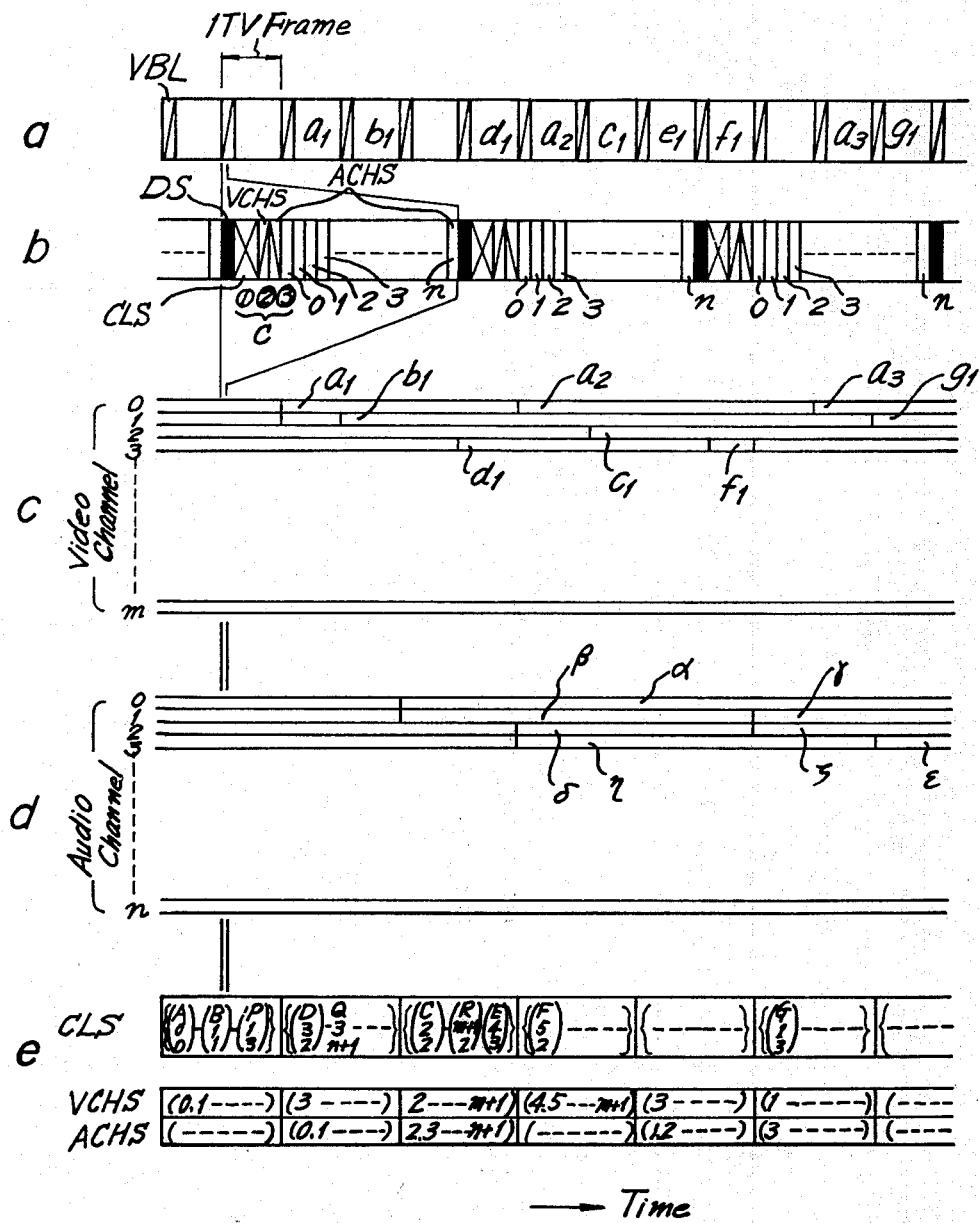
FIG_18

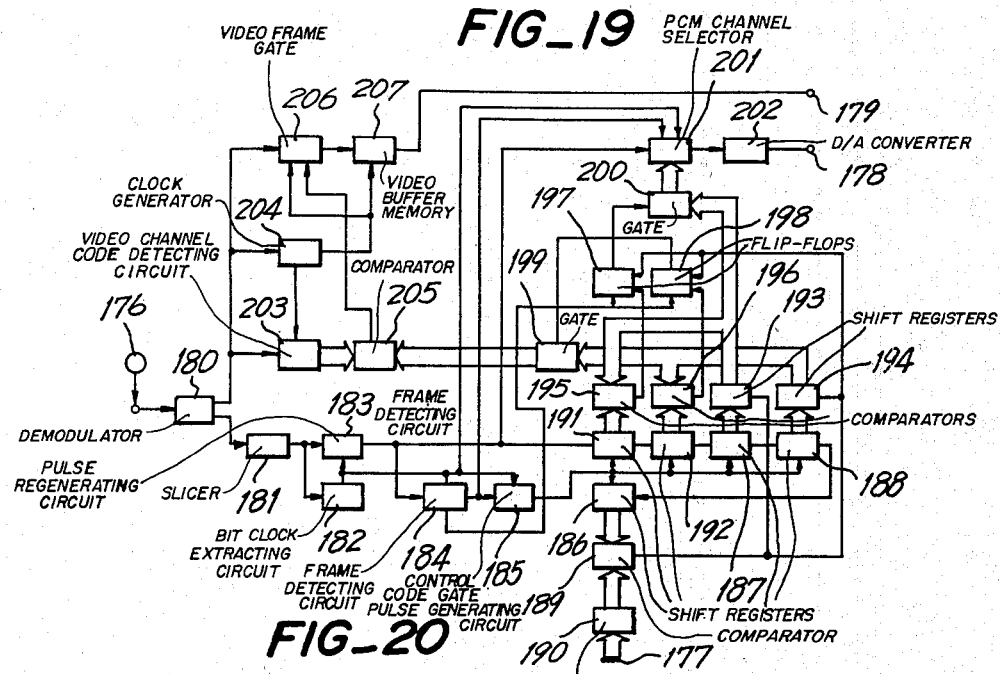
FIG_19
FIG_20
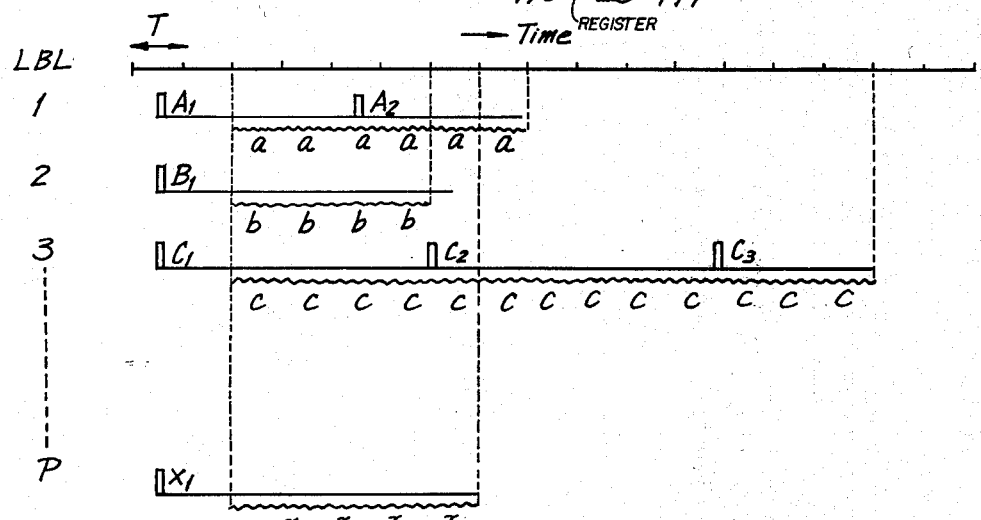

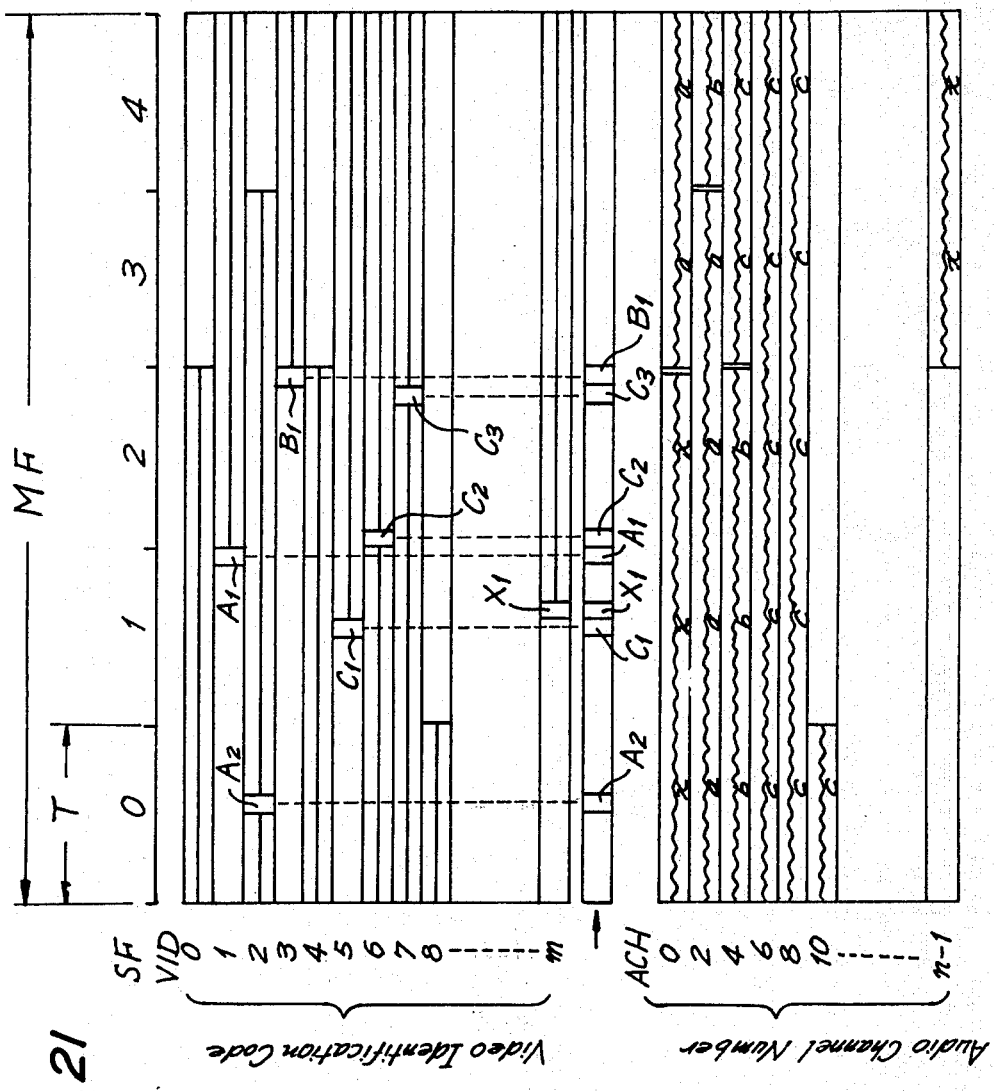
FIG_21

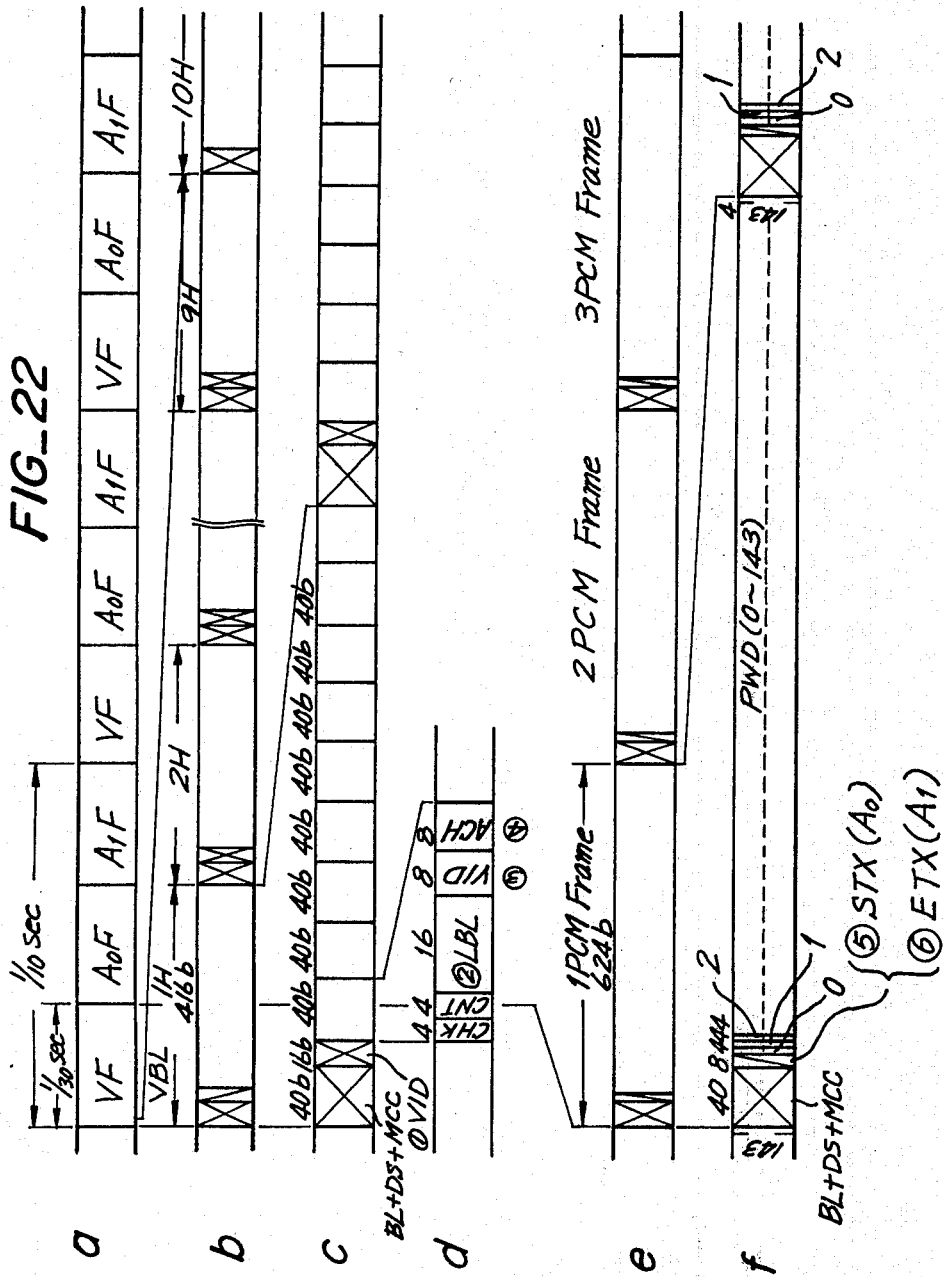

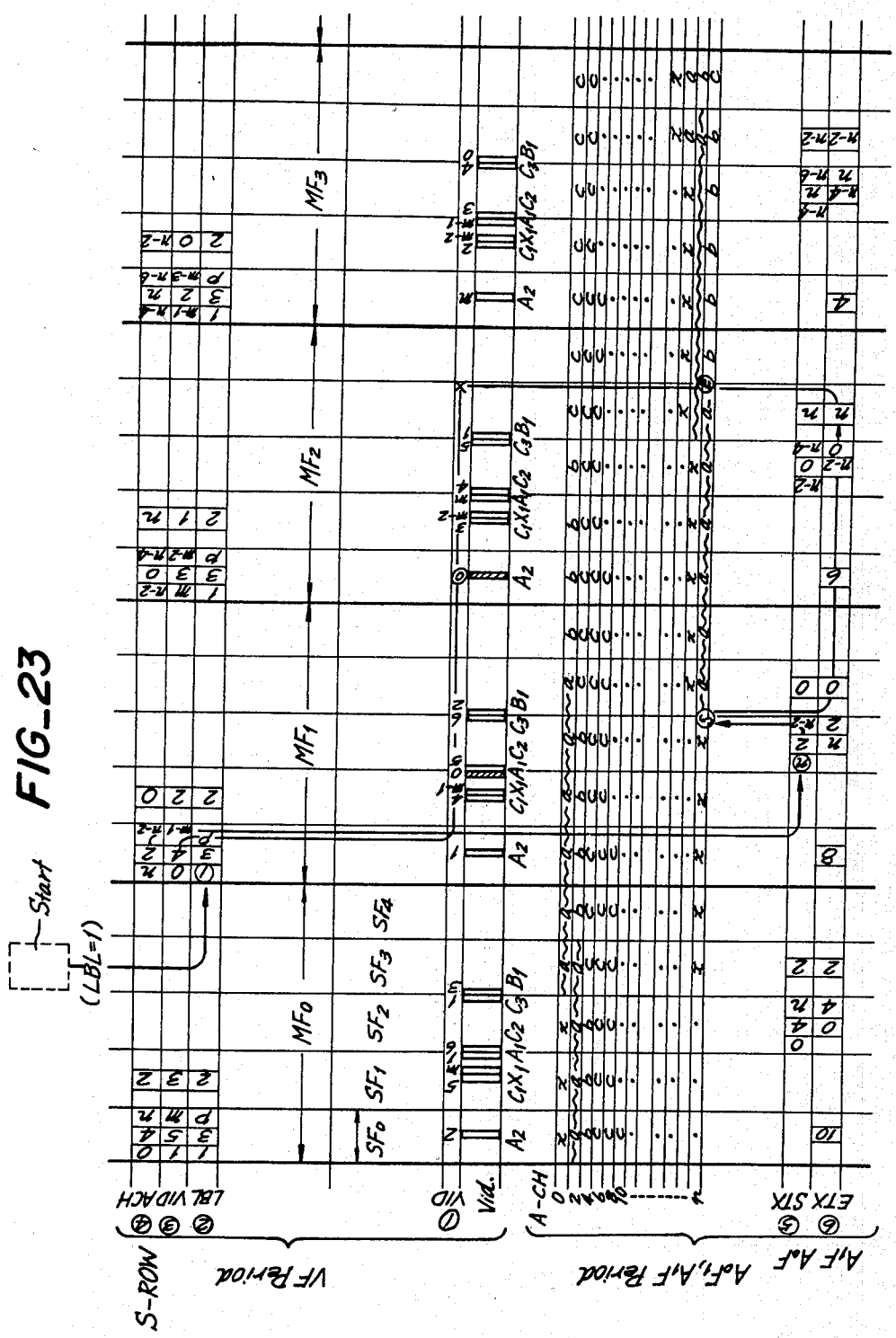
FIG_23

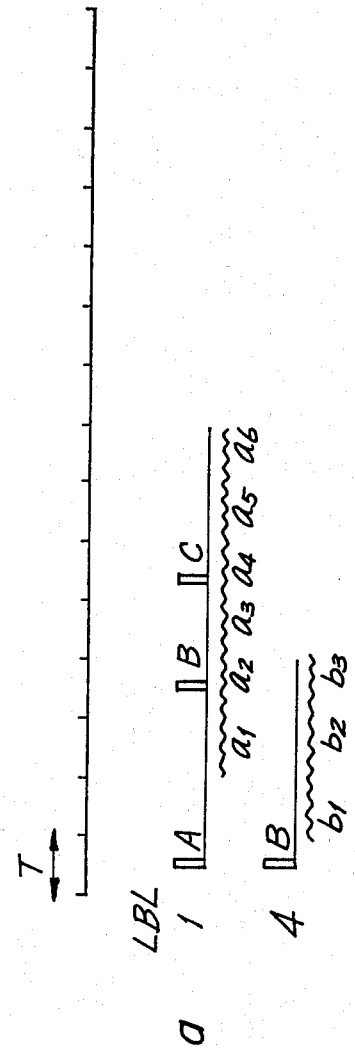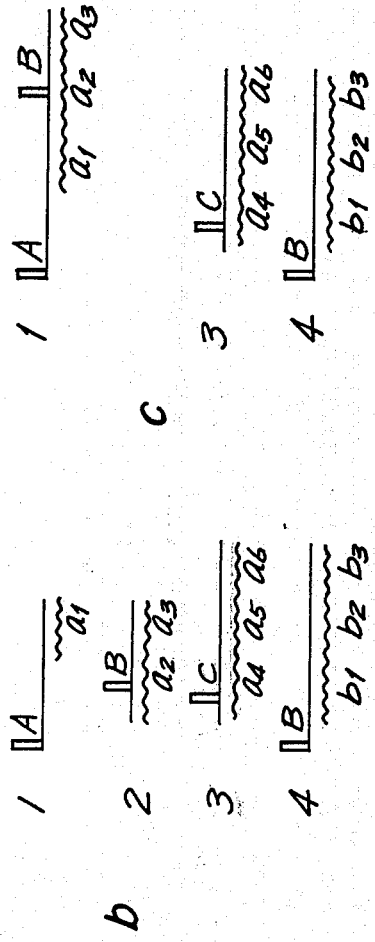
FIG_24

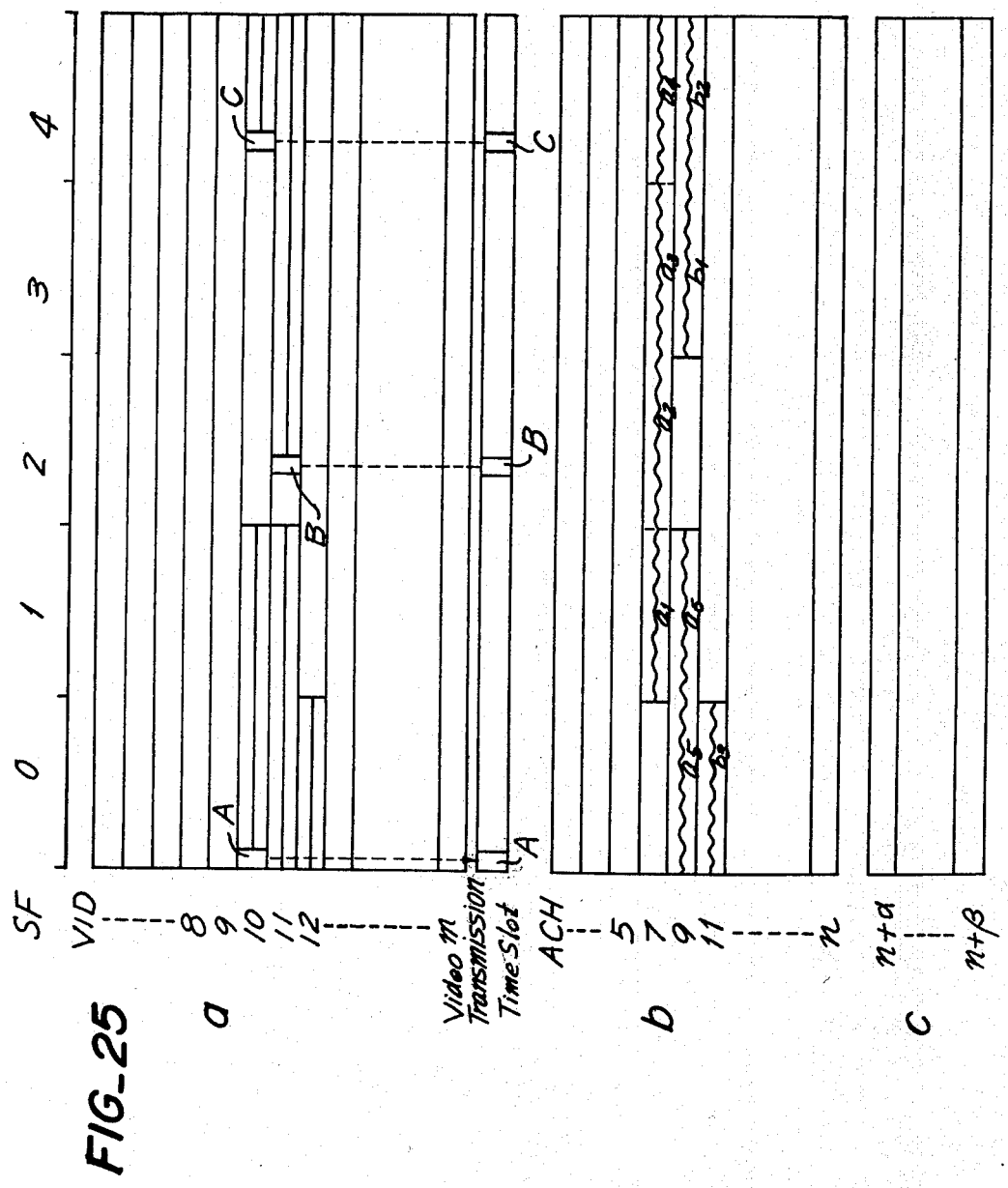

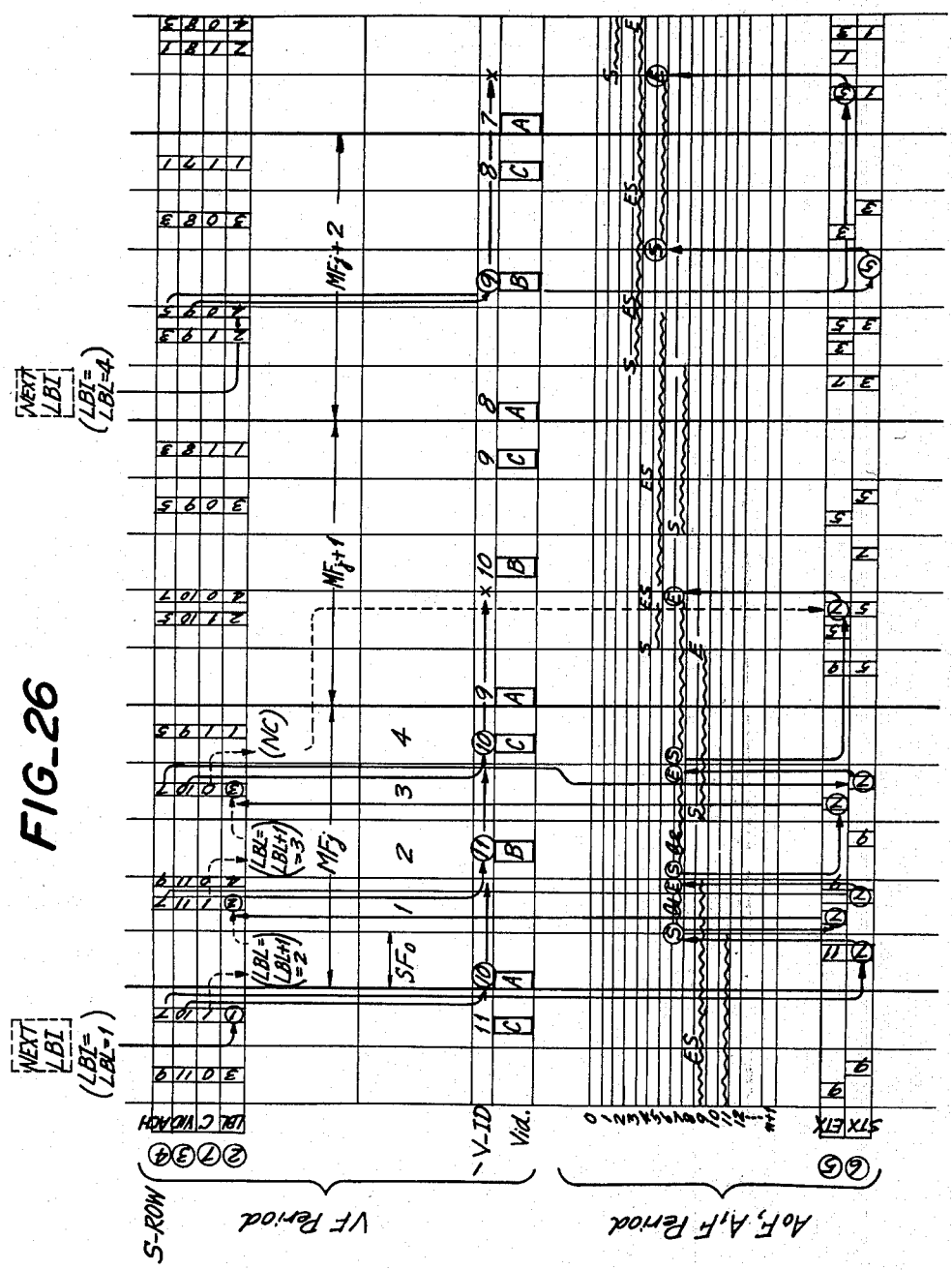

SIGNAL TRANSMISSION SYSTEM FOR TRANSMITTING A PLURALITY OF INFORMATION SIGNALS THROUGH A PLURALITY OF TRANSMISSION CHANNELS

The present invention relates to a signal transmission system in which a plurality of signals having arbitrary time periods are transmitted in a given time interval through a plurality of channels.

In a signal multiplexing transmission system, for example in a still picture transmission system, a plurality of information signals divided alternately into given different time periods having an arbitrary integer ratio are repeatedly transmitted at a given time period.

Before the present invention is explained, the still picture transmission system will be first described. In this system the signals divided into given time periods are television picture signals of a plurality of still pictures and audio signals in the form of PCM signals related to the still pictures and these signals are transmitted alternately.

The present inventors have developed a time division multiplexing transmission system for transmitting video signals of a plurality of still pictures and pulse code modulated (PCM) audio signals related thereto by turns at a time rate of, for example one to two television frames.

Now a basic construction of such a transmitting system will be explained with reference to FIGS. 1 to 4. FIG. 1 shows a format of the video-audio multiplexed signal to be transmitted. FIG. 1a denotes a program of five seconds. This program is termed a master frame MF. The master frame MF consists of five sub-frames SF, each of which has a duration of 1 second. As shown in FIG. 1b, each sub-frame SF consists of 10 video-audio frames VAF and each video-audio frame VAF has a duration of 1/10 seconds. As illustrated in FIG. 1c, each video-audio frame VAF further consists of a video frame VF of one television frame period (1/30 seconds) and an audio frame AF of two television frame period (1/15 seconds). Each audio frame AF further consists of a first audio frame $A_1F$ and a second audio frame $A_2F$, each having one television frame period (1/30 seconds). Thus the master frame MF is composed of a hundred and fifty television frames.

By constructing the master frame MF as mentioned above, in the master frame MF, there may be inserted fifty still pictures. However, in fact, it is necessary to transmit code signals for identifying still pictures and their related sounds and for indicating timings of starts and ends of various signals. It is advantageous to transmit such code signals in the video frames VF rather than in the audio frames AF. In the present embodiment, code signals are transmitted in a video frame VF of each sub-frames SF. A frame during which the code signals are transmitted is referred as a code frame CF. FIG. 1d shows a part of the sub-frame SF which includes such a code frame CF. Therefore, in the master frame MF, there are inserted 45 still pictures and thus it is required to transmit 45 sounds related thereto, i.e. 45 channels of audio signals.

Sound like speech or music needs several seconds or more to give some meaning, because sound is inherently continuous. In the present embodiment the maximum duration of each sound relating to each still picture is limited to ten seconds. As mentioned above the master frame MF has duration of only 5 seconds, so that in order transmit sounds of 10 seconds it is necessary to use the number of channels twice the number of sound channels. That is in order to transmit sounds of 45 channels relating to 45 still pictures, it is required to establish 90 audio channels. Moreover, it is impossible to transmit audio signals in the video frames VF. Therefore, PCM audio signals must be divided and allocated in the audio frames AF only. In order to effect such an allocation treatment for audio signals, the PCM audio signals of 90 channels are divided into two groups PCMI and PCMII as shown in FIG. 1e. Portions of PCMI corresponding to the second audio frames $A_2F$ and the video frames VF are delayed for two television frame periods of 1/15 seconds and portions of PCMII corresponding to the video frames VF and the first audio frames $A_1F$ are delayed for one television frame period of 1/30 seconds. PCM signals thus delayed form audio channels A and C as illustrated in FIG. 1e. Portions of PCMI and PCMII which correspond to the first audio frames $A_1F$ and the second audio frames $A_2F$, respectively are directly inserted in audio channels $B_1$ and $B_2$ to form an audio channel B. In this manner in the audio channels A, B and C, there are formed vacant frames corresponding to the video frames VF. By effecting such an allocation for the audio signals, in each audio frame AF it is necessary to establish a number of audio channels which is one and half times of the number of the audio signal channels. In the present embodiment, a hundred and thirty five audio channels have to be provided in each audio frame AF. In this manner, audio signals of a hundred and thirty five channels are inserted in each audio frame AF in the form of PCM signals with being allocated in given time slots.

An embodiment of a transmitting apparatus for effecting the above mentioned still picture — PCM audio signal time division multiplexing transmission will now be explained with reference to FIG. 2. The transmitting apparatus comprises a video signal processing system and an audio signal processing system. The video signal processing system comprises a random access slide projector 1, on which is loaded slides of still pictures to be transmitted. The projector 1 projects optically an image of a slide of a still picture onto a television camera 3. The camera 3 picks up the image and produces an electrical video signal. The video signal is supplied to a frequency-modulator 5 and a carrier is frequency-modulated by the video signal. FM video signal is amplified by a recording amplifier 7 and an amplified video signal is supplied to a video recording head 9. This head 9 is an air-bearing type floating head and is arranged to face a surface of a magnetic disc memory 11. The head 9 is driven by a head driving mechanism 13 so as to move linearly in a radial direction above the surface of the disc memory 11. The disc memory 11 is preferably made of a plastic disc having coated a magnetic layer thereon. This kind of memory has been described in detail in an NHK Laboratories Note, Ser. No. 148, "Plated magnetic disc using plastic base"; December 1971. The disc 11 is rotatably driven by a motor 15 at a rate of 30 rounds per second. There is further provided an air-bearing type floating head 17 for reproducing video signals recorded on the disc memory 11. The reproducing head 17 is also driven by a driving mechanism 19 so as to move linearly in a radial direction above the surface of the disc 11. The magnetic heads 9 and 17 are moved intermittently so that on the surface of the disc 11 there are formed many concentric circular tracks. On each track is recorded the video signal for one television frame period corresponding to each still picture. The reproduced video signal from the reproducing head 17 is supplied to a reproducing amplifier 21 and the amplified video signal is further supplied to a frequency-demodulator 23. The demodulated video signal from the frequency-demodulator 23 is supplied to a time-error compensator 25, in which time-errors of the demodulated video signal due to non-uniformity of rotation of the disc memory 11 can be compensated. The time-error compensator 25 may be a device which is sold from AMPEX Company under a trade name of "AMTEC". The time-error compensated video signal is supplied to a video input terminal of a video-audio multiplexer 27.

The audio signal processing system comprises an audio tape recorder 29 of remote controlled type. On this tape recorder 29 is loaded a tape on which many kinds of audio signals related to the 45 still pictures have been recorded. The reproduced audio signals from the tape recorder 29 are supplied to a switcher 31 which distributes each audio signal corresponding to each still picture to each pair of recording amplifiers 33-1, 33-2; 33-3, 33-4; . . . 33-n. The amplified audio signals from the amplifiers 33-1, 33-2, 33-3 . . . 33-n are supplied to audio recording heads 35-1, 35-2, 35-3 . . . 35-n, respectively. There is provided an audio signal recording magnetic drum 37 which is rotated by a driving motor 39 at a rate of one revolution or 5 seconds. As already described above each sound corresponding to each still picture lasts at the longest for 10 seconds, so that each audio signal of each sound is recorded on two tracks of the magnetic drum 37 by means of each pair of audio recording heads 35-1, 35-2; 35-3, 35-4; . . . 35-n. That is a first half of a first audio signal for five seconds is recorded on a first track of the drum 37 by means of the first recording head 35-1 and then a second half of the first audio signal is recorded on a second track by means of the second head 35-2. In this manner, the successive audio signals corresponding to the successive still pictures are recorded on the magnetic drum 37.

The audio signals recorded on the drum 37 are simultaneously reproduced by audio reproducing heads 41-1, 41-2, 41-3 . . . 41-n, the number of which corresponds to the number of the audio recording heads 35-1, 35-2, . . . 35-n. In the present embodiment $n=90$. The reproduced audio signals are amplified by reproducing amplifiers 43-1, 43-2, 43-3 . . . 43-n. The amplified audio signals are supplied in parallel to a multiplexer 45 in which the audio signals are multiplexed in time division mode to form a time division multiplexed (TDM) audio signal. The TDM audio signal is then supplied to an A-D converter 47 to form a PCM-TDM audio signal. In this case a sampling frequency of the audio signal is selected to 10.5 KHz. This PCM audio signal is further supplied to an audio allocation processor 49 in which the PCM audio signal is allocated in the audio frames AF as explained above with reference to FIG. 1e. The detailed construction and operation of the audio allocation processor 47 will be explained later. The PCM audio signal supplied from the processor 49 is a two-level PCM signal. This two-level PCM signal is converted in a two-four level converter 51 into a four-level PCM signal. The four-level PCM audio signal is supplied to an audio signal input terminal of the video-audio multiplexer 27. In the multiplexer 27, the video signal from the time-error compensator 25 and the four-level PCM audio signal from the two-four level converter 51 are multiplexed in a time division mode. A multiplexed video-audio signal from the multiplexer 27 is supplied to a code signal adder 53 which adds to the multiplexed video-audio signal the code signal for selecting desired still pictures and their related sounds at a receiver end to form the signal chain shown in FIG. 1d. The signal chain from the code signal adder 53 is further supplied to a synchronizing signal adder 55 in which a digital synchronizing signal is added to form an output video-audio signal to be transmitted.

In the transmitting apparatus shown in FIG. 2, there are further provided servo amplifiers 57 and 59 so as to maintain the rotation of the video disc memory 11 and the audio magnetic drum 37 to be constant.

In order to transmit the output video-audio signal as a television signal, it is necessary to synchronize the operation of the various portions of the transmitting apparatus with an external synchronizing signal. To this end, there is further provided a synchronizing and timing signal generator 61 which receives the external synchronizing signal and generates synchronizing and timing signals R, S, T, U, V, W, X, Y and Z for the camera 3, the servo amplifiers 57 and 59, the time-error compensator 25, the audio multiplexer 45, the A-D converter 47 the audio allocation processor 49, the two-four level converter 51 and the synchronizing signal adder 55, respectively. The generator 61 further supplies synchronizing and timing signals to a control device 63 which controls selection of still pictures and sounds, recording, reproducing and erasing of video and audio signals, generation of code signal, etc. The control device 63 further receives instruction signals from an instruction keyboard 65 and supplies control signals A, B, C, D, E, F and G to the projector 1, the audio tape recorder 29, the code signal adder 53, the video recording amplifier 7, the video recording head driving mechanism 13, the video reproducing head driving mechanism 19 and the switcher 31, respectively.

FIG. 3 shows a detailed construction of the audio allocation processor 49. In FIG. 3, there are also shown the multiplexer 45, the A-D converter 47 and the two-four level converter 51. When independent audio signals of ninety channels are to be transmitted, they are divided into two groups each including 45 channels. These audio signals are supplied to a pair of multiplexers 45I and 45II and a pair of A-D converters 47I and 47II, respectively, to form a pair of PCM time division multiplexing signals PCMI and PCMII as shown in FIG. 1e.

The audio allocation processor 49 comprises gates 67, 69, 71 and 73. The signal PCMI is supplied to the gates 67 and 69 and the other signal PCMII is supplied to the gates 71 and 73. To the gate 67 is applied such a gate signal from the synchronizing and timing generator 61 shown in FIG. 2 that the gate 67 is opened for two frame periods $t_0-t_2$, $t_3-t_5$ . . . and closed for one frame period $t_2-t_3$, $t_5-t_6$ . . . in each three frame periods. To the gate 69 is applied a gate signal which has a reverse polarity as that of the gate signal supplied to the gate 67, so that the gate 69 is closed for two frame periods $t_0-t_2$, $t_3-t_5$ . . . and opened for one frame period $t_2-t_3$, $t_5-t_6$ . . . in each three frame periods. The gate 71 is opened for two frame periods $t_1-t_3$, $t_4-t_6$ . . . and closed for one frame period $t_0-t_1$, $t_3-t_4$ . . . in each three frame periods, but delayed for one frame period with respect to the gate 67. The gate 73 is closed for two frame periods $t_1-t_3$, $t_4-t_6$ . . . and opened for one frame period $t_0-t_1$, $t_3-t_4$ . . . in each three frame periods, but delayed for one frame period with respect to the gate 69. The construction and operation of these gates are well-known in the art, so that a detailed explanation thereof is not necessary. To an output of the gate 67 is connected a delay circuit 75 which delays input signals by two frame periods and to an output of the gate 73 is connected a delay circuit 77 which delays input signals by one frame period. A mixing circuit 79 is connected to both outputs of the gates 69 and 71. Output signals of the delay circuits 75 and 77 and the mixing circuit 79 are supplied to a time division multiplexing device 81 to from a time division multiplexed signal.

The signal PCMI is gated by the gate 67 for a period $t_0-t_2$ and delayed by the delay circuit 75 for two frame periods to form the signal A shown in FIG. 1e. The other signal PCMII is gated out by the gate 73 for a period $t_1-t_3$ and delayed by the delay circuit 77 for one frame period to form the signal C shown in FIG. 1e. Moreover, a signal portion of the PCMI for a period $t_2-t_3$ is gated out by the gate 69 to form the signal $B_1$ shown in FIG. 1e and a signal portion of the PCMII for a period $t_3-t_4$ is gated out by the gate 71 to form the signal $B_2$ also shown in FIG. 1e. The signals $B_1$ and $B_2$ are mixed in the mixing circuit 79 and transferred to the time division multiplexing device 81 as a third channel signal B.

To the time division multiplexing device 81 are also supplied the first and second audio channels A and C to form the PCM-TDM audio signal which is further supplied to the two-four level converter 51.

In the manner mentioned above, it is possible to form a vacant frame for a period $t_1-t_2$ and the video signal can be transmitted in such a vacant frame.

In the transmitting apparatus mentioned above, the random access slide projector 1 is controlled by the control device 63 to project successive 45 still pictures and the video recording head 9 is driven by the mechanism 13 so as to face tracks of the disc memory 11. In this case, the video recording head 17 moves in one direction to face alternate 23 tracks so as to record 23 still pictures and then moves in an opposite direction to face remaining 22 tracks which situate between the tracks on which the video signals of first 23 still pictures have been recorded. The video recording amplifier 7 receives a gate signal D of 1/30 seconds from the control device 63 and supplies a recording current to the video recording head 9 for said period. The motor 15 for driving the disc 11 is controlled by the servo amplifier 57 to rotate at a constant angular velocity of 30 rps. The servo amplifier 57 detects the rotation of the disc 11 and controls the motor 15 in such a manner that the detected signal coincides with the timing signal S supplied from the generator 61. The video reproducing head 17 is driven by the mechanism 19 in the same manner as the video recording head 9. The reproducing head 17 is moved in the audio frame and code frame periods and is stopped in the video frame period to reproduce the video signal in a correct manner. The reproducing head 17 repeatedly reproduces the video signal of 45 still pictures.

As already explained, the audio signal of each sound relating to each still picture is recorded on two tracks of the magnetic drum 37. This drum 37 is driven by the motor 39 and this motor 39 is controlled by the servo amplifier 59. The servo amplifier 59 detects the rotation of the drum 37 and controls the motor 39 in such a manner that the detected signal coincides with the timing signal T supplied from the generator 61.

It is possible to revise a portion of the previously recorded pictures or sounds to new pictures or sounds while reproducing the remaining pictures and sounds. For picture information, the video recording head 9 is accessed to a given track by the head driving mechanism 13 and a new picture is projected by the random access slide projector 1 and picked up by the television camera 3. The video signal thus picked up is supplied to the frequency-modulator 5 and then to the recording amplifier 7. Before recording, a d.c. current is passed through the video recording head 9 and the previously recorded video signal is erased. Then the new video signal is recorded on the erased track of the disc 11. For sound information, a new sound is reproduced by the audio tape recorder 29 and a given track of the magnetic drum 37 is selected by the switcher 31. Before recording, the selected track is erased by an erasing head (not shown) corresponding to the selected recording head. These operations are controlled by the control signals supplied from the control device 63 on the basis of the instruction from the instruction keyboard 65 and the timing signals from the generator 61.

Next, a basic construction of a receiver will be explained with reference to FIG. 4. A received signal is supplied in parallel to a synchronizing signal regenerator 83, a video selector 85 and an audio selector 87. In the synchronizing signal regenerator 83, a synchronizing signal is regenerated from the received signal. The synchronizing signal thus regenerated is supplied to a timing signal generator 89. To the timing signal generator 89 is also connected an instruction keyboard 91. The timing signal generator 89 produces timing signals to the video selector 85 and the audio selector 87 on the basis of the synchronizing signal from the regenerator 83 and the instruction from the keyboard 91. The video selector 35 selects a desired video signal and the audio selector 87 selects a desired audio signal related to the desired video signal. The selected video signal of the desired still picture is once stored in an one frame memory 93. The video signal of one frame period is repeatedly read out to form a continuous television video signal. This television video signal is displayed on a television receiver 95.

In the transmission system mentioned above, since each audio signal belonging to each still picture must be transmitted within a time period of 10 seconds, there is a disadvantage that a freedom of expression of programs is limited due to the limited time period of the audio signals.

In order to avoid such a disadvantage one can select the transmission period of the audio signal as integer multiples of 5 seconds as shown in FIG. 5. That is to say a plurality of audio signals, for example audio signals A and B are transmitted by means of a plurality of audio channels Ch 0 to Ch 4. The audio signal A is divided into three signal portions $A_1$, $A_2$, and $A_3$ at a period of 5 seconds and these signal portions are transmitted in channels CH 0 to Ch 2 and the audio signal B is divided into two signal portions $B_1$ and $B_2$ and these signal portions are transmitted in channels Ch 3 and Ch 4, In this manner a plurality of signals inserted in a plurality of channels are transmitted repeatedly at the given time period of 5 seconds.

By means of such a transmission system it is possible to transmit the audio signals having arbitrary time lengths, but upon dividing the audio signal by the period of five seconds, if there is produced a fraction of the audio signal shorter than 5 seconds, a portion of 5 seconds except for said fraction becomes a vacancy and thus there is formed a redundant portion in the transmission channel. Therefore, such a transmission system is very inconvenient for transmitting a number of audio signals within a limited time period.

The present invention has for its object to provide a signal transmission system in which the disadvantage mentioned above can be avoided and the audio signals having any time periods can be efficiently transmitted in regardless of the repetition period so as to increase the freedom of producing programs.

It is another object of the invention to provide a signal transmission system wherein any combinations of video signals and the audio signals can be selected at will.

A signal transmission system according to the invention for transmitting a plurality of information signals each having arbitrary time length through a plurality of channels, characterized in that said plurality of information signals are distributed to said plurality of transmission channels and in each channel after an information signal comes to an end a next information is successively transmitted and at the same time control signals for indicating information signal transmitting channels are transmitted.

Now the present invention will be explained in detail with reference to the accompanying drawings in which:

FIGS. 1a, 1b and 1c show constructions of a master frame, a sub-frame and a video-audio frame of video and audio signals transmitted by a time division multiplexing transmission system, FIG. 1d illustrates a portion of said signal which includes a control frame and FIG. 1e shows a manner of effecting an audio PCM signal allocation;

FIG. 2 illustrates diagrammatically a basic construction of a transmitter for the still picture transmission system;

FIG. 3 is a block diagram showing a detailed construction of an audio allocation processor shown in FIG. 2;

FIG. 4 is a block diagram showing a principal construction of a receiver for the still picture transmission system;

FIG. 5 shows diagrammatically an audio signal transmission pattern in which an audio signal chain is divided at a master frame period;

FIG. 6 illustrates an embodiment of an audio signal transmission pattern according to the invention;

FIG. 7 shows a transmission signal for explaining an example of transition timing for the audio signals;

FIG. 8 illustrates a transmission signal for explaining another example of the audio signal transition timing;

FIG. 9 shows a signal format of a PCM frame according to the invention;

FIGS. 10a and 10b illustrate embodiments of audio channel allocation apparatuses according to the invention;

FIGS. 11a, 11b and 11c show signal waveforms for explaining the signal allocation;

FIG. 12 is a block diagram of an audio signal receiving device according to the invention;

FIG. 13 shows another embodiment of a transmission signal pattern according to the invention;

FIG. 14 is a block diagram of an embodiment of a signal transmission system according to the invention;

FIGS. 15a, 15b and 15c show a transmission signal and a transmission control code for explaining the operation of the transmission system according to the invention;

FIG. 16 is a block diagram for showing a detailed construction of a receiver;

FIG. 17 is a block diagram of another embodiment of a signal transmission system according to the invention;

FIGS. 18a–18e show a transmission signal and a transmission control code for explaining the operation of the transmission system according to the invention;

FIG. 19 is a detailed block diagram of a receiver;

FIG. 20 illustrates a few examples of program material;

FIGS. 21a and 21b show video and audio allocation maps for forming program materials which are once recorded and them are repeatedly transmitted;

FIGS. 22a–22f show a signal format for recording the video and audio signals according to the allocation maps;

FIG. 23 illustrates an explanatory diagrams for explaining the transmission signal according to the invention;

FIGS. 24a and 24b show examples of program materials one of which is used commonly;

FIGS. 25a–25c show another embodiment of the video and audio allocation maps; and FIG. 26 shows an explanatory diagram for explaining the signal transmission system according to the invention.

FIG. 6 shows diagrammatically a construction of a plurality of channels through which a plurality of audio signals having arbitrary time periods are transmitted according to the invention. In the present example, there are provided 96 channels in a transmission path and these 96 channels are divided into odd number channels Ch 1, Ch 3 . . . Ch 95 and even number channels Ch 0, Ch 2, Ch 4 . . . Ch 94 with considering the fact that the audio PCM signals are divided into two groups as shown in FIG. 1e for the audio signal allocation. A repetition period of the audio signals in each channel is also determined to 5 seconds.

According to the invention upon transmitting a plurality of audio signals A, B, C . . . and $\alpha, \beta, \gamma$ . . . each having an arbitrary time period through the transmission path comprising 96 channels Ch 0 to Ch 95, at first these audio signals A, B, C . . . and $\alpha, \beta, \gamma$ . . . are arranged in a series form so as to form signal chains [A, B, C . . . ] and [$\alpha, \beta, \gamma$ . . . ] and then these signal chains are divided at said given repetition period of 5 seconds, respectively and these divided signal segments are distributed to the channels Ch 1, Ch 3, . . . Ch 95 and Ch 0, Ch 2, Ch 4 . . . Ch 94 in a time sequential manner. As the result thereof, a portion $A_1$ of 5 seconds of the audio signal A is transmitted through the first channel Ch 1 and the remaining portion $A_2$ having a time period shorter than 5 seconds is transmitted through the third channel Ch 3. Concerning the audio signal B following to said audio signal A, a first portion $B_1$ of the signal B is transmitted through the third channel Ch 3 during the remaining time period of the 5 seconds which is not occupied by the audio signal portion $A_2$. A second signal portion $B_2$ is transmitted through the channel Ch 5 for 5 seconds and the last signal portion $B_3$ is transmitted through the channel Ch 7 during a time period shorter than 5 seconds. During the remaining time period of the 5 seconds allotted to the channel Ch 7, a signal portion $C_1$ of a third audio signal C is transmitted.

According to the invention a plurality of audio signals are transmitted through a plurality of channels in the manner mentioned above and thus there is not formed a vacant portion between successive audio signals. In this manner the signal chain composed of a plurality of audio signals is divided into signal portions each having a duration of 5 seconds and these signal portions are simultaneously transmitted through a plurality of channels in 5 seconds as shown in FIG. 6. This results in the signal arrangement shown in FIG. 6 having a unit period of five seconds and this signal arrangement is repeatedly transmitted at the repetition period of 5 seconds.

Upon reproducing a plurality of audio signals at a receiver end, during a first 5 second period the signal portion $A_1$ transmitted through the channel Ch 1 is reproduced and during a next 5 seconds the signal portion $A_2$ transmitted through the channel Ch 3 is recovered. In this manner the signal portions $A_1$ and $A_2$ are continuously reproduced in turns and thus the original audio signal A is reproduced.

According to the invention a signal having an arbitrary time length is transmitted through a plurality of channels belonging to the same group. That is, for the signal A, the channels Ch 1 and Ch 3 belonging to the odd number channel group are used and for the signal B also the odd number channels Ch 3, Ch 5 and Ch 7 are adopted. But the signal $\alpha$ is transmitted through the even number channels Ch 0 and Ch 2 and the signal $\beta$ is also transmitted through the even number channels Ch 2, Ch 4 and Ch 6. In FIG. 6, vacant portions are formed in the last channels Ch 95 and Ch 94 of the odd and even number channel groups, respectively, but these vacant portions may be filled with significant signals which will be continuous to the signals A and $\alpha$ in the first channels Ch 1 and Ch 0, respectively and closed signal chains may be formed.

In the other channels vacant periods may be formed artificially without continuously transmitting audio signals when it is desired to start transmission of special audio signal from a signal transmission starting time in the period of 5 seconds or it is required to provide silent periods at ends or at intermediate portions of the audio signals according to a necessity for program production. But as a rule the end of the audio signal, for example the audio signal A and the start of a succeeding audio signal, for example the audio signal B are transmitted without coming in contact with each other.

In order to extract a necessary signal from the transmitted signals, it is considered to add an identification code to a head portion of each audio signal. In this case all of audio signals must be simultaneously reproduced in a parallel mode and a desired audio signal must be extracted from a channel in which a given identification code will appear. But in such a case the construction of the reproducing apparatus becomes extremely complicated and large in size.

Thus according to the invention, a timing for changing the audio signal is determined with a time unit which has been previously established and information about the time unit and the channel in which an audio signal is changed to another audio signal is transmitted.

FIG. 7 shows an example of a signal format of the still picture-audio signal transmission system according to the invention. In this embodiment said time unit for switching the audio signals is selected to 1/10 seconds.

As already explained with reference to FIG. 1, in the still picture transmission system the video-audio frame VAF having the time period of 1/10 seconds and composed of one frame picture signal and two frame audio signal constitutes a unit signal and this unit signal is repeatedly transmitted. Thus, when a time length of 1/10 seconds is selected as the timing unit for switching the audio signals, this timing unit identifies with the video-audio frame VAF. As shown in FIG. 7 when the signal portion $A_2$ of the audio signal A comes to an end in a video-audio frame $VAF_n$, the signal portion $B_1$ of the next audio signal B is started at a starting point of a next video-audio frame $VAF_{n+1}$. Therefore in the present embodiment a vacant portion between the end of a signal and a start of a next signal can be limited within 1/10 seconds and thus the efficiency of the transmission path is not lost and the switching of the audio signals can be realized by simple control means.

FIG. 8 shows another embodiment of a manner for switching the audio signals in which the audio signals are switched at a timing of the sub-frame SF unit, i.e., one second unit. In such a case the code frame CF can be used to transmit information about switching of the audio signals. In this embodiment the switching of the audio signals can be effected much easier.

Next an embodiment of a format of a PCM frame will be explained with reference to FIG. 9.

As already explained in connection with FIG. 1, the sampling frequency of the audio signals is 10.5 KHz and thus a time length of the PCM frame of PCM-TDM signal is one and a half of the horizontal synchronizing signal of the television signal, that is 95.3 micro seconds. In this time period, 624 pulses are composed. That is a pulse clock frequency is selected to about 6.54 MHz. In an example 40 bits are allotted to the PCM synchronizing signal DS and during this period the frame and bit synchronizing information are transmitted. To switching signals STX or ETX are allotted eight bits. The remaining 576 pulses are divided with four pulses into 144 time slots and are allotted to 144 channels for the PCM-TDM audio signal. The pulse for the PCM-TDM audio signal is a four-level signal which contains information of two bits.

The switching signal STX is used as an audio start signal and the switching signal ETX is used as an audio end signal. For example, when the audio signal A comes to an end in the video-audio frame $VAF_n$ as shown in FIG. 7, the end signal ETX is inserted in a PCM frame of the preceding video-audio frame $VAF_{n-1}$. In this case when the audio signal A is transmitted in the channel Ch 3, the end signal ETX of eight bits expresses the channel number "3" and inserted at the ETX bit position. Then the next audio signal B starts at the video-audio frame $VAF_{n+1}$, the start signal STX is transmitted in a PCM frame of the preceding video-audio frame $VAF_n$. In this case the audio signal B is transmitted through the third channel Ch 3 and thus the STX signal denotes 3 at the STX bit position.

In order to distinguish STX and ETX, the STX signals are inserted in the first audio frame $A_1F$ and the ETX signals are inserted in the second audio frame $A_2F$. Theoretically there are transmitted 700 PCM frames in the audio frame of 1/15 seconds and the switching signals inserted in the 350 PCM frames in the first audio frame $A_1F$ can be used as the start signals STX and similarly the switching signals inserted in the 350 PCM frames in the second audio frame $A_2F$ can be used as the end signal ETX.

Thus in the embodiment shown in FIG. 7 the information expressing 3 is transmitted in a time slot allocated for the switching signal in a PCM frame in the second audio frame $A_2F$ of the video-audio frame $VAF_{n-1}$ and this switching information is used as the ETX signal. This signal indicates that the audio signal A transmitted through the channel Ch 3 will be ended in the next video-audio frame $VAF_n$. At the receiver end in response to said switching information the reproduction of the audio signal A through the channel Ch 3 is stopped at the end of the video-audio frame $VAF_n$. In the switching signal time slot of a PCM frame in the first audio frame $A_1F$ of the video-audio frame $VAF_n$ the switching information expressing 3 is inserted. This switching information is used as the start signal STX and at the receiver end it is denoted that transmission of the audio signal B through the channel Ch 3 will start in the next video-audio frame $VAF_{n+1}$.

Since each of the audio frames $A_1F$ and $A_2F$ comprises 350 PCM frames, it is possible theoretically to transmit STX and ETX for 350 channels. But in the above example, the number of channels is 96, so that the same switching information may be repeatedly transmitted for a plurality of PCM frames so as to improve the reliability or noise immunity.

Next transmitting and receiving apparatuses according to the invention will be described.

FIG. 10a shows an embodiment of a PCM-TDM signal forming apparatus in which a plurality of audio signals are produced by microphones or audio tape recorders. In the drawing, reference numerals 101, 101', 101'', 101'''... denote audio signal sources such as the microphones or the audio tape recorders. The audio signals from the audio signal sources 101, 101'... are supplied to an audio signal recorder 102 and are successively recorded in a series mode. The audio signal of the series form supplied from the audio signal recorder 102 is supplied to an A-D converter 103 and converted into an audio PCM signal. The output PCM signal from the A-D converter 103 is stored in a memory 104. Each address code of the memory 104 is predetermined so as to correspond to each sampling of the audio signal stored therein. The PCM audio signal stored in the memory 104 is once transferred to an auxiliary memory 105 and is rearranged in a multiplexed form. The PCM audio signal stored in the auxiliary memory 105 is recorded on a disc recorder 106 at a suitable speed and thus the PCM signal is recorded as the multiplexed signal. A reference numeral 107 shows an allocation control logic circuit which divides the PCM signals stored in the memory 104 at the given time interval of 5 seconds and the divided PCM signals are multiplexed over the whole channels and recorded on the disc recorder 106. The allocation control circuit 107 inserts the start signal STX or the end signal ETX at the given portion of the PCM frame at a transition of the audio signals while the PCM signal is transferred to the auxiliary memory 105. From an output terminal 108 is derived the audio signal in the form of PCM-TDM as shown in FIG. 9.

FIG. 11a shows the various audio signals $a, b, c, d, e \ldots z$ having different time lengths and supplied from the audio signal sources 101, 101', 101''.... These audio signals are recorded on an audio tape in a series form in the audio signal recorder 102 as shown in FIG. 11b. This audio signal chain is converted into the PCM signal in the A-D converter 103 and the converted PCM audio signal chain is stored in the memory 104.

Under the control of the allocation logic 107, the PCM signal chain is divided at a time interval of 5 seconds and the divided segments are allocated to the odd number channels Ch 1, Ch 3, Ch 5 ... Ch 95 and the even number channels Ch 0, Ch 2, Ch 4, Ch 6 ... Ch 94 and are multiplexed as shown in FIG. 11c. The time division multiplexed PCM audio signals are recorded on the disc recorder 106 via the auxiliary memory 105. During the channel allocation process described above, the audio signal start signal STX or the end signal ETX is inserted at a transition between the successive audio signals as shown in FIG. 11c. As a result on the disc recorder 106, there is recorded the PCM-TDM signal shown in FIG. 9. From the output terminal 108, there is obtained such a PCM-TDM signal.

FIG. 10b shows another embodiment of the PCM-TDM audio signal forming apparatus. In this embodiment there is provided an endless multi-track tape recorder 109 instead of the audio signal recorder 102 shown in FIG. 10a. The endless multi-track tape has a length corresponding to 5 seconds and comprises 96 tracks the number of which is equal to that of the audio PCM channels. The audio signals supplied from the audio signal sources 101, 101', 101''... are recorded on sequential tracks of the endless multi-track tape without forming a gap between successive audio signals and the audio signals shown in FIG. 11a are simultaneously reproduced and the reproduced signals are supplied in parallel to an A-D converter 110 and converted into PCM audio signals therein and these PCM audio signals are supplied to a multiplexing circuit 111 and converted into PCM-TDM audio signals. The start and end signals STX and ETX are inserted at the multiplexing circuit 111. In the above manner the PCM-TDM audio signals can be derived from the output terminal 108.

Next an embodiment of the audio signal reproducing portion at the receiver end will be explained with reference to FIG. 12.

In FIG. 12 the received PCM-TDM audio signals are supplied to an input terminal 112. The PCM-TDM audio signals are supplied to a bit clock extracting circuit 113 and also to a waveform regenerating circuit 114. The bit clock extracting circuit 113 extracts the bit clocks from the periodical signal of the PCM-TDM signals. A PCM frame synchronizing circuit 115 extracts the PCM frame synchronizing signal from the PCM-TDM signals supplied from the waveform regenerating circuit 114 on the basis of the bit clocks from the bit clock extracting circuit 113. The output PCM signal from the circuit 114 is also supplied to a master frame synchronizing circuit 116 which extracts the master frame synchronizing signal having a repetition period of 5 seconds from the PCM signals also on the basis of the bit clocks. The PCM signals is further supplied to a STX and ETX detecting circuit 117 in which the audio signal start and end signals STX and ETX are detected also on the basis of the bit clocks and a command signal given by a receiver from a command input device 123.

There is further provided a PCM channel gate pulse generator 118 which produces a gate signal for gating out given channel signal transmitted through given channel denoted by the information supplied from the STX and ETX detector 117. The information about the end signal ETX is supplied directly to the gate pulse generator 118, but the information about the start signal STX is supplied to the generator 118 through an adder 119. When the audio signal lasts for more than the master frame period of 5 seconds, the same audio signal is transmitted through successive channels. Thus in such a case the channel number denoted by the start signal STX should be increased by two each time the master frame changes so as to make continuous the PCM channel gate pulse for the same audio signal. In this case the reason why the channel number is increased by two is that the audio channels are divided into the odd number channel group and the even number channel group and each channel group constitutes a loop.

If at the transmitter end the channel number is increased by two each time the master frame is changed in the single audio signal and at the receiver end the audio signal is reproduced from the same channel, it is not necessary to provide the adder 119.

Concerning the end signal ETX, since the channel number at which the audio signal comes to an end is transmitted, the end signal ETX can be directly supplied to the PCM channel gate pulse generator 118.

The PCM channel gate pulse is supplied to a gate 120 and the PCM signal from the given channel is gated out. The gated out PCM audio signal is supplied to a D-A converter 121 and is converted into the original audio signal which appears at an output terminal 122.

In the receiving apparatus mentioned above, the PCM audio signal in the given channel denoted by the start signal STX can be extracted at the gate 120 from the PCM audio signals supplied from the waveform regenerating circuit 114 and the gate 120 is closed by the end signal ETX, so that the given audio signal can be selectively reproduced. In this manner according to the invention even if the audio signals are transmitted over a plurality of channels, any required audio signal can be extracted by means of the switching signals STX and ETX.

FIG. 13 shows another embodiment of the present invention. In FIG. 13, a plurality of audio signals having the master frame period are inserted in the channels Ch 1, Ch 3, Ch 5, Ch 7, Ch 9 . . . just like as FIG. 6. The master frame period is determined to be equal to five seconds on account of a permissible awaiting time for ordinal audio signals with taking into consideration psychological characteristics of viewers. But among various kinds of audio signals there are some audio signals which need not satisfy the above requirement. In such a case the audio signals may be transmitted at time periods which are equal to two, three . . . $n$ times of 5 seconds For example, in channels Ch $i$+1, Ch $i$+3. . . Ch $i$+9 shown in FIG. 13, the audio signals are transmitted in alternate master frames. In this case the maximum access time for the audio signals is equal to two times of the master frame period, i.e. 10 seconds. In such a case other informations may be transmitted in vacant master frames so as to transmit much more informations. In channels Ch $k$+1, Ch $k$+3, . . . Ch $k$+9 . . . , the audio signals are transmitted in every three master frames at a period equal to three times of the master frame period. In this case the maximum access time is equal to 15 seconds and an average waiting time is equal to seven and half seconds. Also in this case other informations may be transmitted in vacant master frames and thus the transmission capacity will increase by three times. In this manner the audio signals may be transmitted at a period equal to $n$ times of the master frame period.

Even if the audio signals are transmitted at different periods which are equal to integer multiples of the master frame period, these audio signals can be transmitted simultaneously by suitably allocating these portions to various channels as shown in FIG. 13.

FIG. 14 shows another embodiment of the transmission system according to the invention. In FIG. 14, a reference numeral 131 denotes a transmitter which transmits a number of informations, in the present embodiment audio signals in a time division multiplexed mode to a plurality of receivers 132, 132' . . . . A reference numeral 133 shows an information generating apparatus which may be composed of recording media 134 on which the information signals to be transmitted have been recorded. These information signals are supplied to the transmitter 131 via a plurality of information input terminals 135. The transmitter 131 comprises control terminals 136. The transmitted starting signals from an allocation control device 137 in the transmitter to the information generating device 133. The transmitter 131 further comprises an audio signal processing device 138 which allocates the input audio signals into given audio channels under control of the allocation control device 137. The audio signals corresponding to a plurality of channels and supplied from the input processing device 138 are converted into audio PCM-TDM signals in a time division multiplexing device 139. To the PCM-TDM signals supplied from the multiplexing device 139 are added transmission control codes supplied from the allocation control device 137 in a transmission control code adding device 140. From an output terminal 141 of the transmitter, the PCM-TDM audio signals having the transmission control code added thereto are transmitted to a transmission path 142. To the transmission path 142 are connected a plurality of braches 143, 143' . . . and the transmitted signals are supplied to the receivers 132, 132' . . . through the branches.

In the receiver 132, the PCM-TDM audio signal supplied from the transmitter 131 is received at an input terminal 144 and is suplied to a PCM channel selector 145. The receiver comprises a transmission control code decoder 146 which collates the transmission control codes added to the transmitted signals with a content identification code given by a receiver through a content identification code set terminal 147. When the transmitted code coinciding with the set code is detected, the decoder 146 produces a channel indicating signal. This channel indicating signal is supplied to the PCM channel selector 145 which extracts the desired PCM audio signal transmitted in the given channel denoted by the channel indicating signal. The extracted PCM audio signal is supplied to a D-A converter 148 wherein the PCM audio signal is demodulated to produce an analogue audio signal which is supplied to an output terminal 149.

Next an operation of the apparatus shown in FIG. 14 will be explained with reference to FIG. 15. In FIG. 15$b$ there are shown audio signals $\alpha,\beta,\gamma,\delta,\epsilon,\rho$ . . . each having an arbitrary time length and these audio signals have been recorded on the recording media 134 in the information producing device 133. These audio signals are suitably processed in the device 138 and are inserted in a plurality of audio channels Ch 0, Ch 1, Ch 2, Ch 3 . . . Ch $n$ as shown in FIG. 15$b$. In order to easily distinguish these signals in case of extracting a desired audio signal at the receiver end, the time lengths of the audio signals are such determined that transitions of the audio signals in each audio channel occur at a given timing. In the still picture transmission system explained with reference to FIG. 1, the same signal form is repeated at the period of the video-audio frame VAF composed of the one video frame and two audio frames and thus the audio signal switching timing is determined to the video-audio frame period. But in the present embodiment since only the audio signals are transmitted, the switching timing of the audio signals may be any constant period. The period of this audio signal switching timing is referred as a super frame SPF.

A plurality of audio signals inserted in a plurality of channels are converted into the PCM-TDM signals illustrated in FIG. 15a in the multiplexing device 139. In each PCM frame are included the digital synchronizing signal DS for the frame and bit synchronization, the transmission control code C and the PCM channels PCM-CH consisting of a plurality of channels Ch 0, Ch 1 ... Ch n.

As shown in FIG. 15a the transmission control code C is composed of a content identification code CS and a transition control code CHS. FIG. 15c shows a content of the transmission control code. At upper portions of brackets illustrated in FIG. 15c there are shown the content identification codes $\alpha, \beta, \gamma$ ... and at lower portions the channel numbers 0, 1, 2, 3 ... denoted by the transition control codes CHS.

The content identification code CS denotes a content of the audio signal and serves as an identification signal for extracting a desired audio signal at the receiver end. When a communication is effected between a plurality of receivers and the single transmitter, it is necessary to add a receiver address code to the transmitted signal. In such a case the content identification code CS may be replaced by the receiver address code. The transition control code CHS together with the content identification code CS denote the channel number through which the audio signal will be transmitted and are transmitted in a super frame followed by the super frame in which the audio signal identified by the content identification code CS will be transmitted.

For example, when the audio signal $\alpha$ starts at the first channel Ch 0 in the nth super frame SPFn, in the preceding super frame SPFn-1, the content identification code CS=$\alpha$ and the transition control code CHS=0 are transmitted. This is expressed by ( $\begin{smallmatrix}\alpha\\0\end{smallmatrix}$ ) as shown in FIG. 15c. The transmission control code C consisting of the content identification code CS and the transition control code CHS is transmitted once in each PCM frame. Thus in order to transmit the transmission control code C even when the transitions are simultaneously effected in all audio channels, the number k of the PCM frames in a super frame SPF must be more than that of the PCM channels.

In the still picture transmission system mentioned above, the PCM frame frequency is determined to 10.5 KHz and the period of the super frame is selected to be equal to the period of the VAF, so that in the super frame there are 700 PCM frames. The channels for the PCM audio signal are 144 time slots and the number of the PCM frames in the VAF period is sufficiently higher than the number of the PCM channels.

At the receiver end 132, the viewer provides the content identification code corresponding to the desired audio signal to the content identification code preset input terminal 147. This content identification code is compared with the transmitted content identification code CS at the transmission control code decoder 146. When both identification codes coincide with each other, the number of channel through which the desired audio signal will be transmitted is detected. This information is supplied to the PCM channel selector 145 and at the PCM channel selector 145 the time slot signal of the related channel is extracted from the next VAF period. In this manner the desired audio signal can be derived. This PCM audio signal is converted into the analogue audio signal in the D-A converter 148 and the audio signal is supplied from the output terminal 149 to a speaker or an earphone. This reproduction should be continued as long as the audio signal losts. The related signal comes to an end when another audio signal is transmitted through the same channel. Thus the PCM channel selector 145 is so controlled that the reproduction is continued until the next transition control code CHS of the same channel number is detected and when the transition code CHS of the same channel number is transmitted, this code is detected at the transmission control code decoder 146 and then the reproduction is stopped at the of of the related VAF.

FIG. 16 shows a detailed construction of the receiver 132. In FIG. 16 the PCM-TDM audio signals shown in FIG. 15a are supplied to an input terminal 150. The received signal is supplied to a demodulator 151 and the information signal in the form of modulated carrier is demodulated. The demodulated signal is supplied to a slicer 152 wherein the amplitudes of the signals are sliced and are adjusted to a given level. The output from the slicer 152 is supplied to a bit clock extracting circuit 153 which produces bit clocks synchronized with the bit synchronizing signal inserted in the digital synchronizing signal DS of the PCM-TDM signal. The output from the slicer 152 is also supplied to a pulse regenerating circuit 154 which restores the waveform of the PCM signal on the basis of the bit clocks supplied from the bit clock extracting circuit 153. The output from the circuit 154 is supplied to a frame detecting circuit 155 which detects synchronizing signals having the periods of the PCM frame synchronizing signal and the super frame with utilizing the PCM signal from the circuit 154. The PCM frame synchronizing pulse $f_p$ is supplied to a transmission control code gate signal generating circuit 156. When this circuit 156 receives the PCM frame pulse $f_p$, it starts to control the bit clocks supplied from the bit clock extracting circuit 153 and produces two gate pulses corresponding to time slots of the content identification code CS and the transition control code CHS, respectively. The PCM output signal from the circuit 154 is supplied to series-parallel converting shift registers 157 and 158. To the shift register 157 is also supplied from the circuit 156 the gate signal for gating out the time slot of the content identification code CS and then the shift register 157 stores the transmitted content identification code CS. To the shift register 158 is also supplied from the circuit 156 the gate signal for gating out the time slot of the transition control code CHS and thus it stores the transmitted transition control code CHS. The content identification code CS applied from the viewer is supplied to a shift register 159 through input terminals IN and stored therein. The content identification codes stored in the shift registers 157 and 159 are collated to each other in a comparator 160 and when both content identification codes coincide with each other, the comparator 160 produces a coincidence pulse. This coincidence pulse is supplied to a shift register 161 and the transition control code CHS stored in the shift register 158 is transferred to the shift register 161. The coincidence pulse from the comparator 160 is also supplied to a flip-flop circuit 162 to which is also supplied the super frame synchronizing pulse $f_s$.

When the coincidence pulse and the super frame synchronizing pulse are supplied to the flip-flop 162, the flip-flop 162 produces an output signal by means of which a gate circuit 163 is opened. That is to say after the content identification codes have coincided with each other, the gate circuit 163 is opened at a next coming timing pulse of the super frame period, i.e., the VAF period and thus the related transition control code CHS is supplied from the shift register 161 through the gate circuit 163 to a channel selector 164. To the channel selector 164 is supplied the PCM signal from the circuit 154. The channel selector 164 extracts the PCM signal transmitted through the given channel denoted by the transition control code CHS, i.e. the code of the channel number at which the audio signal will be switched. The PCM audio signal thus extracted is supplied to a D-A converter 165 and is converted into an analogue audio signal which is supplied to an output terminal 166.

The receiver further comprises a comparator 167 which compares the transition control code CHS stored in the shift register 161 with the transition control codes CHS which are successively set in the shift register 158. When these transition control codes coincide with each other, i.e., when the transmission of the desired audio signal comes to an end and a next audio signal is transmitted through the same channel, the comparator 167 produces an output to reset the flip-flop circuit 162 at a timing of a next following super frame synchronizing pulse $f_s$ and then the gate 163 is closed so as to stop the extraction of the given PCM signal from the transmitted PCM-TDM signal at the channel selector 164. In this manner the desired audio signal can be selectively reproduced from the transmitted PCM-TDM signal.

FIG. 17 illustrates another embodiment of the transmission system according to the invention. In the embodiment shown in FIG. 14 only one kind of information, i.e. the audio signal is transmitted, but in the present embodiment, two or more kinds of information, i.e. the video signals and the audio signals can be transmitted.

In FIG. 17, the same elements as those shown in FIG. 14 are denoted by the same numerals. The video and audio signals have been recorded on the recording medium 134. The transmitter 131 comprises input terminals IN for receiving the video signal from the video and audio information producing device 133. The video signal is similar to the television signal, but it includes different still picture information for each frame. Also at a head portion of each frame there is provided a picture identification code for identifying each picture. To each video signal is related each audio signal.

The video signals are supplied to a video input processing device 168 which allocates the video signals to a plurality of channels under the control of the allocation control device 137. The video signals are allocated by a video multiplexing device 169 to given time slots (a period corresponding to a frame period of the television signal), i.e. given time intervals. The transmission control code from the allocation control device 137 includes information about the allocation of the video signals. Such a transmission control code is added to the PCM signal. The transmitter 131 further comprises a modulator 170 in which a carrier is modulated by the video and audio signals, respectively or by a combination signal thereof. The modulated carrier is transmitted to the transmission path 142 through the output terminal 141.

The receivers 132, 132' ... comprise a demodulator 171 which demodulates the modulated carrier to produce the video signal and PCM-TDM audio signal. These demodulated signals are supplied to a frame gate circuit 172 which extracts the video signal of a given video frame by means of a gate signal supplied from the transmission control code decoder 146. The video signal of one frame gated out by the frame gate 172 is supplied to a video buffer memory 173 and stored therein. This buffer memory 173 is repeatedly read out so as to obtain the still picture video signal in the form of the continuous television signal. This still picture video signal is derived from a video output terminal 174. The still picture video signal has the form of the television signal and thus can be reproduced by a display device for the ordinary television signal.

Now the operation of the transmission system shown in FIG. 17 will be explained with reference to FIG. 18.

In FIG. 18a, a plurality of still pictures $a_1, b_1, d_1, a_2, c_1$ ... each having different content have a signal form similar to the television signal. At the transmitter end each still picture is transmitted within a single frame period and at the receiver end the still picture video signal is repeatedly reproduced so as to obtain the still picture video signal in the form of the continuous television signal.

To a front portion, for example, a vertical flyback period VBL of each video frame is added a video channel code. The video channel code is composed of binary eight bits and thus it is possible to denote the channel numbers, $0, 1, 2 \ldots m$ ($m=255$). A plurality of video signals having the same video channel code number belong to the same video channel and these video signals are transmitted through the related video channel. Time slots of the video signals do not have a constant period as compared with the time slots of the PCM-TDM audio signals, but are provided irregularly in accordance with necessity. Thus the video signals are arranged in the video channels as shown in FIG. 18c.

FIG. 18b illustrates an array of the audio PCM-TDM signals $\alpha, \beta \ldots$ in a plurality of channels shown in FIG. 18d. In one PCM frame there are provided a frame and bit synchronizing signal DS, a content list code CLS, a video transition control code VCHS and an audio transition control code ACHS and in the remaining period there are provided time slots of the audio PCM signals of $n$ channels. The content list code CLS, the video transition control code VCHS and the audio transition control code ACHS indicate a list of program material consisting of pictures and a sound of an arbitrary time length. The program material is transmitted with a content identification codes A, B, C ... P, Q, R as indexes (or address codes of receivers by which the signal is to be received) together with the video channel number $0, 1, 2 \ldots m, m+1 \ldots$ and the audio channel number $0, 1, 2, 3 \ldots n, n+1 \ldots$ as shown in FIG. 18e.

For example the content identification code illustrated in FIG. 18e denotes that a combination of a picture and a sound expressed by A is consisted of a video signal having added thereto the video channel code 0 in the vertical blanking period VBL and the PCM-TDM audio signal inserted in the time slot corresponding to the audio channel 0.

Similarly the code $$\begin{bmatrix} P \\ 1 \\ 3 \end{bmatrix}$$

denotes the program P consisting of the video signal in the video channel 1 and the audio signal in the audio channel 3. Moreover, the code $$\begin{bmatrix} Q \\ 3 \\ n+1 \end{bmatrix}$$

may be used. This code denotes that the program Q consists of only the video signal inserted in the video channel 3, because there is not existed an audio channel $n+1$. A code $$\begin{bmatrix} R \\ m+1 \\ 2 \end{bmatrix}$$

denotes that the program R is consisted of only an audio signal inserted in the audio channel 2, because a video channel $m+1$ does not exist.

In FIG. 18 the code $$\begin{bmatrix} A \\ 0 \\ 0 \end{bmatrix}$$

denotes that the program A has three pictures $a_1$, $a_2$ and $a_3$ and the sound $\alpha$. The transition control codes VCHS and ACHS are channel numbers in which the video signal and audio signal are switched. As illustrated in FIG. 18b these codes are transmitted in audio PCM frame during a super frame SPF which will be followed by a super frame at which the video signal and audio signal will be switched. When the content list code CLS and the transition control codes VCHS, ACHS are transmitted in the same video and audio frame VAF, the content list code should precede the transition control codes.

FIG. 19 depicts a detailed construction of the receiver.

The transmitted signal is supplied to an input terminal 176. To a program selection terminal 177 is supplied a content identification code for a desired program or a receiver's address of the related receiver. The input signal is demodulated by a demodulator 180 and divided into the still picture video signal and the audio PCM-TDM signal. The PCM-TDM signal is discriminated by a slicer 181 and supplied to a bit clock extracting circuit 182 and a pulse regenerating circuit 183. As in the embodiment shown in FIG. 16, bit clocks bc are derived from the PCM-TDM signal by the circuit 182 and the derived bit clocks bc are supplied to the circuit 183 so as to regenerate the pulse signal. This regenerated PCM-TDM signal is further supplied to a frame detecting circuit 184 so as to detect the frame pulses $f_p$ and super frame pulses $f_s$. The frame pulse $f_p$ and bit clocks bc are supplied to a transmission control code gate pulse generating circuit 185 and gated bit clock pulses for extracting the transmission control code C multiplexed in the PCM signal are generated. The gated bit clock pulses are the bit clocks which are gated for the period of the transmission control code C shown in FIG. 18b.

There is further provided a series circuit of series-parallel converting shift registers 186, 187, 188, 191 and 192. The gated bit clock pulses are supplied in parallel to these shift registers and the transmission control code C in the regenerated PCM-TDM signal is stored therein. In this case the index of the content list code CLS, that is the content identification code corresponding to A, B, C . . . P, Q, R . . . or the receiver address code is stored in the shift register 186. The video channel number of the content list code CLS is stored in the shift register 188 and the audio channel number of the content list code CLS is stored in the shift register 187. The shift register 192 stores the video channel number VCHS of the video channel transition control code shown in FIG. 18e and the shift register 191 stores the audio channel number ACHS of the audio channel transition control code. The contents stored in these shift registers are renewed at a rate of the PCM frame period.

In a comparator 189 the content stored in the shift register 186 is compared with the content identification code or the receiver address code stored in a register 190 through the terminal 177. When these contents coincide with each other, the comparator produces a coincidence pulse which is supplied to shift registers 193 and 194. Then the contents stored in the shift registers 188 and 187 are transferred in a parallel form to the registers 194 and 193, respectively. In FIG. 19, the parallel code lines are denoted by thick arrows.

The coincidence pulse generated from the comparator 189 is also supplied to flip-flop circuits 197 and 198 so as to reset them. The contents stored in the registers 194 and 192 are compared with each other in a comparator 196 and when they coincide with each other, the comparator 196 produces a coincidence pulse which is supplied to the flip-flop circuit 198. Similarly the contents of the registers 193 and 191 are compared with each other in a comparator 195 and when they coincide with other, the comparator 195 generates a coincidence pulse which is supplied to the flip-flop circuit 197. The flip-flop circuits 198 and 197 are reset by an output from the comparator 189 and then after they receive the coincidence pulses from the comparators 196 and 195, they are switched on at a timing of the super frame pulse $f_s$ and they are switched off at the timing of the super frame pulse $f_s$, when they receive the coincidence pulses again.

The output of the flip-flop circuit 197 is supplied to a gate 200 and when the flip-flop circuit 197 is switched on, the gate 200 is opened and the content stored in the register 193 is transferred through the gate 200 to a PCM channel selector 201 which selects from the transmitted PCM signal a given PCM channel denoted by the audio channel number from the register 193. The extracted PCM channel signal is converted into an analogue audio signal in a D-A converter 202 and the audio signal is supplied to an audio output terminal 178.

The output of the flip-flop circuit 198 is supplied to a gate 199 and the gate 199 is made opened as long as the flip-flop circuit 198 is switched on. The video channel number stored in the register 194 is transferred to a comparator 205 through the gate 199 for a period from an instance at which the same video channel number as that stored in the register 194 appears at the register 192 storing the video transition control code VCHS to an instance at which the same channel number appears again (which means that another signal is transmitted in the same channel).

The video channel code added to a front portion VBL of each video signal frame is detected by a video channel code detecting circuit 203. A synchronizing signal separating clock generator 204 separates the synchronizing signal from the still picture video signal and supplies the synchronizing signal of the television frame period to a video frame gate 206 and a video buffer memory 207. The generator 204 further produces clock pulses for detecting the video code and supplies them to the video channel code detecting circuit 203. The video channel code in the still picture video signal and the video channel code extracted from the transmission control code and stored in the register 194 are compared with each other in the comparator 205 and when they coincide with each other, the comparator 205 produces a coincidence pulse which is supplied to the video frame gate 206. The gate 206 gates out the desired video signal for a succeeding one frame period and the extracted video signal is stored in the video buffer memory 207. The memory 207 may be a rotary type recording medium such as a magnetic disc and its rotation is servo-controlled on the basis of the synchronizing signal having the television frame period. The video signal once recorded is repeatedly read out and supplied to a video output terminal 179.

In the manner mentioned above, a given information set at the receiver or a given video-audio information related to the receiver address can be exclusively extracted by means of the transmission control code.

In the above embodiment there are provided especially the content transition control channel, but in case of PCM-TDM signal a particular code of the PCM code may be used as the content transition code which may be transmitted in each PCM channel. In this case a PCM code of the information signal corresponding to said particular code may be transmitted by replacing it to another PCM code having an analogue level which is near the particular code. Then a distortion of the analogue information to be transmitted can be maintained to be extremely small.

Next an embodiment of the present invention will be explained with reference to FIG. 20. In this embodiment the same signal is repeatedly transmitted at a given period. As shown in FIG. 20 many still pictures $A_1, A_2, B_1, C_1, C_2 \ldots X_1$ and sounds $a, b, c \ldots X$ are combined to compose a plurality of program materials each having a given time period. In this case the audio signals have been previously processed to have time lengths which are equal to integer multiples of a unit time length T. To these program materials are added labels LBL (LBL=1, 2 ... P).

These program signals are inserted in the master frame MF (having a duration of 5 seconds) consisting of 50 video-audio frames VAF each of which is composed of a video frame of one television frame and an audio frame of two television frames as shown in FIG. 1a.

FIG. 21 illustrates an allocation map for repeatedly transmitting the signals of P sets of program materials with converting them into a multiplexed signals. The P sets of program materials are separated into the video and audio signals which are recorded as the multiplexed signals in accordance with the allocation map. FIG. 21a shows an allocation map for the video signal and FIG. 21b an allocation map for the audio signal. In FIG. 21a, VID is an identification number of the video signal. Each video signal is transmitted with having a code signal denoting the identification number added thereto. In FIG. 21b ACH denotes channel numbers in multiplexing channels through which the audio signals are transmitted in a time division multiplexing mode. In the embodiment shown in FIG. 21, the video allocation map is divided by the video identification numbers VID=0 to VID=$m$, and the audio allocation map is divided by the audio channel numbers ACH=0 to ACH=$n$. These maps are further divided by the subframe time interval SF=0 to SF=4. In FIG. 21 the audio channel numbers ACH are only even numbers, but they may be any numbers and moreover they may be arranged in any order. This may be also applied to the video identification numbers VID. The unit of the time interval SF is made equal to said unit time T (for example 1 second) by means of which the audio signals are divided and thus the whole time length MF of five subframes SF=0 to SF=4 is equal to an integer multiple of T (for example 5 seconds). The time length MF corresponds to the repetition period of transmission.

The program materials are sequentially inserted in the allocation map. As illustrated in FIG. 21 the video signal $A_1$ of the first program material having a label LBL=1 is allotted at a position denoted by VID=1 and SF=1 on the allocation map. A position of the video signal $A_1$ of the program material (LBL=1) is so determined that the video signal $A_1$ precedes with respect to a start of the audio signal a by a given time period (for example ±(T/2)). In FIG. 21 the start of the audio signal a is set at a position denoted by ACH=0 and SF=3.

When the video signal $A_2$ of the program material (LBL=1) is allotted on the map, the construction of the program material (LBL=1) shown in FIG. 20 is taken into account and the video signal $A_2$ is allotted to a position denoted by VID=2 and SF=0. The audio signal a is allotted to continuous positions of 6T period denoted by ACH=0, SF=3; ACH=0, SF=4; ACH=0, SF=4; ACH=2, SF=0; ... ACH=2, SF=3. In the manner mentioned above, the first program material (LBL=1) has been allotted and then second program material (LBL=2) is allotted. In this case the second program material (LBL=2) is so allotted that its audio signal b is continued from the audio signal a of the first program material (LBL=1). That is the audio signal b is allotted to positions denoted by ACH=2, SF=4; ACH=4, SF=0; ACH=4, SF=1 and ACH=4, SF=2.

In order to precede the video signal $B_1$ by the unit time period T with respect to the audio signal b, it is desired to allocate the video signal $B_1$ to a position denoted by VID=2 and SF=2. But in fact, the video signal $B_1$ cannot be allotted at such a position, so that it is allotted to a position of VID=3 and SF=2. By this measure the number of VID becomes much more the number of ACH. But since the number of ACH corresponds to the number of channels which are really occupied by the audio signals and on the contrary VID corresponds to the number of the video identification code, if the number of VID increases by two times, the number of codes of the video identification code increases only by one bit. Thus in view of obtaining a high transmission efficiency, it is advantageous to shorten intervals between successive audio signals.

In the above described manner the successive program materials having labels LBL=3 . . . LBL=P, respectively are allocated on the allocation map. In this case the last video identification number VID is so allocated that a position VID=$m$, SF=4 is followed by a position VID=0, SF=0 and for the audio channel number a position ACH=$m$, SF=4 is followed by a position ACH=0, SF=0 and thus the allocation maps of the video identification numbers and the audio channel numbers constitute closed loops, respectively. Moreover, the video identification numbers are so allotted that the transmission time slots of the video signals in case of the frame time division multiplexing transmission do not superpose with each other. That is to say the allocation positions of the video identification numbers are so adjusted with considering the given time period ($\pm T/2$) that projections of the these positions $A_1, A_2 \ldots X_1$ onto a time axis do not overlap one another. In this case if the allocation positions could not be adjusted to produce the given time period, then the sequence of the program materials is changed. Moreover even if the changing the sequence of the program materials, the allocation positions overlap one another, blanks may be inserted beteeen successive audio signals.

According to the editorial map thus formed, the video and audio signals are edited. The form of signal to be recorded is same as that of the signal to be transmitted. The signal form is illustrated in FIG. 22a.

As already explained with reference to FIG. 1, the video and audio signals are transmitted in a time division mode with using the frame period (1/30 sec.) of the television signal as a unit period. That is a time division ratio of the video and audio signals is 1:2. Since one still picture is transmitted by one frame, the still pictures can be transmitted at a rate of 10 pictures per second. The audio signals of 96 channels are multiplexed in a PCM signal form with 144 (96×3/2) words taking into account the audio allocation treatment shown in FIG. 1e and are transmitted in the audio frames $A_1F$ and $A_2F$. The sampling frequency of the audio signal is 10.5 KHz and the quantization is effected with eight bits (four quaternary digits).

FIG. 22b depicts a portion of the vertical flyback period VBL of the video frame VF in an enlarged scale. During the periods 1H–9H, the control signal is transmitted. In order to maintain the horizontal and vertical synchronization for the whole period of the video frame VD, digital synchronization VF, BL+DS+MCC are added at a period of H, but the ordinary synchronizing signal of the television signal is not added. In the audio frame the digital synchronizing signals are inserted at the PCM frame period of 1/10.5 KHz as shown in FIG. 22e. The digital synchronizing signals are so contracted to maintain the bit synchronization and PCM frame synchronization and to effect video period-audio period mode control and SF switching control. As shown in FIGS. 22e and 22f the audio PCM signal PWD (0–143) and the audio signal transition control signals STX and ETX are inserted in the audio frame at the PCM frame period. In this case in the first audio frame $A_0F$, the audio start signal STX is inserted and in the second audio frame $A_1F$, the audio end signal ETX is inserted. The signals STX and ETX denote the channel number at which the audio signal will start or come to an end.

The signal form of the video period is same as the television signal except the synchronizing signal being replaced by the digital synchronizing signal and the control signal being transmitted for the period of 1H to 9H.

In case of using the signal transmission system according to the invention for a programed instruction, many program materials are extracted in a given order at the receiver end. For this purpose it is necessary to transmit a program material control table. This table composed of many rows and each row comprises a label LBL, the video identification③VID number and the audio channel number④ACH. Here the signal of such a row of the program material control table is denoted as S-ROW.

In each of the periods 1H to 9H of the vertical blanking portion of the video frame there are transmitted the video identification number①VID of the video signal which is transmitted in the related video frame and nine row signals S-ROW of the program material control table as shown in FIGS. 22c and 22d. The video identification code①VID consists of eight bits and is transmitted twice successively.

As shown in FIG. 22d the row signal S-ROW of the program material control table is composed of a check code CHK of four bits, a control code CNT of four bits, the label②LBL of 16 bits, the video identification number③VID of eight bits and the audio identification number④ACH of eight bits. The signal S-ROW corresponds to the content list code CLS shown in FIG. 18 and in the embodiment shown in FIG. 18, the code CLS is inserted in the PCM frame, on the contrary in this embodiment the table signal S-ROW is inserted in the vertical blanking period VBL of the video frame VF. The check code CHK is the least significant four bits of a complementary of the number of "1" in the binary codes CNT, LBL, VID and ACH. By means of each signal S-ROW, the video identification number and the audio channel number of each program are denoted. In FIG. 22c the signal①VID following to the synchronizing signals BL+DS+MCC is the identification code of the video signal belonging to the related transmission period. This identification code①VID should not be confused with③VID in the signal table S-ROW, because there is not any relation between the video signal of the video frame period during which the signal S-ROW is transmitted and the content of this signal S-ROW. During the single H period nine S-ROW signals are transmitted and thus during the single video frame period 81 S-ROW signals of the table are transmitted.

As already described in connection with FIG. 1e, the audio signals are not transmitted in the video frames, but are transmitted only in the audio frames and at the receiver end the audio signals are exploded in the video frames so as to obtain the continuous audio signals.

The program materials having labels LBL=1 . . . LBL=P are edited into the signal form illustrated in FIG. 22 in accordance with the video and audio allocation maps shown in FIG. 21. The signal of one repetition period, i.e. the master frame period MF consisting of five sub-frames $SF_0$ to $SF_4$ is once recorded on the recording device. At a time of transmission this signal is repeatedly reproduced and at the transmitting device the signal conversion is effected so as to shift the channel number through which a given audio signal is transmitted.

According to one aspect of the invention, even if the master frame is changed during a given audio signal is reproduced from a given audio channel, the remaining portion of the given audio signal can be continuously reproduced through the same audio channel. For this purpose at the transmitter end the audio channel is shifted into a next following channel, when the master frame is changed.

FIG. 23 illustrates the transmitted signal which has been treated in the above manner. The signals in a particular master frame $MF_0$ of 5 seconds are the signals of one repetition period which are recorded on the recording device and contain the video and audio signals, the signal table, the video identification signal and the audio start and end control signals. The signal table S-ROW consisting of ②LBL,③VID and④ACH is transmitted in the sub-frame period preceding to the sub-frame in which the video or audio signal denoted by ③ VID or ④ACH will be transmitted. For example the video signal $A_1$ of the program material (LBL=1) is transmitted in the sub-frame $SF_1$ and thus the signal table S-ROW of the program material (LBL=1) is transmitted in the sub-frame $SF_0$. The audio start-end control signals ⑤STX and ⑥ETX are transmitted as the channel number in the sub-frame just before the sub-frame at which the audio signal starts or comes to an end. For example for the audio signal a of the program material (LBL=1) which is transmitted through the audio chanel 0 from the sub-frame $SF_3$, the audio channel number 0 is transmitted in the sub-frame $SF_2$ in the first audio frame $A_0F$ as the audio start signal STX. The sub-frames $SF_0, SF_1 \ldots SF_4$ are transmitted sequentially and after the last sub-frame $SF_4$ is transmitted, the first sub-frame $SF_0$ is once again transmitted. Thus the sub-frames are transmitted cyclically. When a head portion of the program material situates in the first sub-frame $SF_0$, the related signal table S-ROW is transmitted in the last sub-frame $SF_4$.

A channel number shifting device comprises first means for arranging the audio channel in such a manner that the audio signal is continued in the same audio channel even if the master frame MF is changed; second means for changing the identification codes added to the video signals in such a manner that when at the receiver end the same identification is collated, successive pictures having continuous contents may be obtained (in this case the transmission time slots of the video signals are not changed); third means for changing the signal table in accordance with the rearrangement of the audio channels and the modification of the video identification codes; and fourth means for changing the audio start and end signals in response to the rearrangement of the audio channels. Since the audio channels are divided into the odd and even number groups, and in each group the audio channels are arranged serially to form a loop, when the channel number is decreased by two each time the master frame MF is changed, the same audio signal can be transmitted through the same channel as shown in FIG. 23. This modification of the audio channel number is expressed as follows;

$$ACH(MF_{j+1})=ACH(MF_j)-2 \qquad (\text{mod. } n+1)$$

In this case the modification is carried out cyclically with the total number $n+1$ of the odd and even audio channels.

Similarly, the video identification number constitutes a loop such as $0, 1, 2, \ldots m$ and thus the video channel number is decreased by one each time the master frame is changed. This modification of the video channel number is expressed as follows;

$$VID(MF_{j+1})=VID(MF_j)-1 \qquad (\text{mod. } m+1)$$

Also in this case the modification is effected cyclically with a period of the number $m+1$ of the video channels. The ACH and VID numbers in the signal table S-ROW are also changed in the same manner as described above. The audio start and end signals STX and ETX are changed in correspondence with the modification of the audio channel number.

When the picture $A_1$ and sound a of the program material (LBL=1) are transmitted, in the first master frame $MF_0$ the picture $A_1$ having VID=1 added thereto is transmitted in the sub-frame $SF_1$ and thus in the signal table S-ROW of the program material (LBL=1) inserted in the sub-frame $SF_0$ ③VID=1 is transmitted. Since the audio signal a is transmitted through the audio channel ACH=0 from the sub-frame $SF_3$, in the signal table S-ROW ④ACH=0 is added to LBL=1, VID=1. As the audio start signal STX the channel 0 is transmitted in the sub-frame $SF_2$. Since the audio signal continues for six sub-frame period, after the sub-frame $SF_4$, the audio signal a is transmitted through the audio channel A-CH=2 in the sub-frame $SF_0-SF_3$. But for the convenience of the receiver in the master frame $MF_1$ succeeding from the master frame $MF_0$, the portion of the audio signal which is to be transmitted through the channel A-CH=2 for the period $SF_0-SF_3$ is shifted to the audio channel A-CH=0 and transmitted through this channel A-CH=0. A head portion of the audio signal a in the sub-frames $SF_3-SF_4$ is shifted to the audio channel A-CH=$n$. In order to transmit the video signal $A_2$ successive to the video signal $A_1$ with the same VID number, in the master frame $MF_1$,①VID=1 is added to the video signal $A_2$ in the sub-frame $SF_0$ and ①VID=0 is added to the video signal $A_1$. Thus the signal table S-ROW of ②LBL=1, ③VID=1 and ④ ACH=0 in the first master frame $MF_0$ is changed to the signal table of ②LBL=1,③VID=0 and④ACH=$n$. The audio end signal for the audio signal a is transmitted as ⑥ETX=2 in the sub-frame $SF_3$ of the master frame $MF_0$ and is transmitted as⑥ETX=0 in the sub-frame $SF_3$ of the master frame $MF_1$.

An apparatus for arranging the signals as shown in FIG. 23 has the same construction as that illustrated in FIG. 17. But in this apparatus the allocation control device 137 has a function for shifting the numbers of the signal table S-ROW and the audio start and end signals each time the master frame is changed. In the video multiplexing device 169, the signal table S-ROW and the video identification code VID for each still picture are inserted in the vertical blanking period VBL of the video frame.

Next a manner for extracting a given signal from the transmitted signal at the receiver end will be explained.

It is assumed that the signal reproduction is to be started with setting the program material (LBL=1) from a time instance shown by "Start" in FIG. 23. This time instance situates at a later half of the first master frame MF₀ and at this time there is not existent a signal of the program material (LBL=1). In the next master frame MF₁, the signal LBL=1 appears. The code ① LBL=1 set by the receiver is collated with the transmitted signal table S-ROW in the transmission control code decoder 146 shown in FIG. 17 and when the coincidence is detected, the channel numbers denoted by this code①LBL=1, i.e.③VID=0,④ACH=$n$ are extracted and stored for a while. Then the video indentification signal ①VID added to the video signal is detected and when①VID=0 is detected (in FIG. 23① VID=0 is detected in the sub-frame $SF_1$ of the master frame $MF_1$), the related video signal $A_1$ is gated out and recorded in the video signal buffer memory and the stored video signal is repeatedly reproduced and thus the still picture $A_1$ is continuously displayed until a next video signal $A_2$ having the identification signal ① VID=0 is transmitted.

Concerning the audio signal the audio start signal⑤ STX is detected until the start signal⑤STX=$n$ is transmitted. When the signal⑤STX=$n$ is detected in the sub-frame $SF_2$, the audio signal transmitted through the channel $n$ is extrated from the next sub-frame $SF_3$ and PCM audio signal is decoded by the D-A converter to produce the analogue audio signal which is reproduced by the speaker. The audio PCM signal transmitted through the same channel n is extracted until the audio end signal⑥ETX=$n$ appears. In the master frame $MF_2$, the end signal⑥ETX=$n$ is transmitted in the sub-frame $SF_3$ and then the reproduction of the audio signal a is interrupted after the sub-frame $SF_3$.

According to the invention any program materials can be used for several programs. For example the picture B of the program material (LBL=1) having three pictures A, B and C is commonly used for the program material (LBL=4) as shown in FIG. 24a.

The program material (LBL=1) shown in FIG. 24a is so divided into three program materials having labels LBL=1 to LBL=3 as illustrated in FIG. 24b that in the program material (LBL=2) only the video signal B is included. As already explained the video and audio allocation maps are formed as shown in FIG. 25. In this case for the program materials (LBL=1 to LBL=3), the audio signal $a_1$, $a_2$, $a_3$, $a_4$, $a_5$ and $a_6$ is arranged to be continuous without interruption. In FIG. 25 the odd number audio channels are used as the audio channels. For LBL=4, since the position of the video signal B is fixed, the video signal B and the audio signal $b_1$, $b_2$ and $b_3$ are allotted within a given time period. The video identification signal VID of the video signal B occupies a position in the allocation map shown in FIG. 25a, which position continues to the end of the longest audio signal among the audio signals related to the video signal B. In this case the audio signal $b_1$, $b_2$ and $b_3$ is longer than the audio signal $a_2$ and $a_3$, the allocation of the video identification signal VID lasts until the audio signal $b_3$ comes to an end.

FIG. 24c illustrates another method of allocation. In this case the program material (LBL=1) is divided into two program materials (LBL=1 and LBL=3). That is, in the program material (LBL=1), there is no video signal after the video signal B. In such a case the position on the allocation map occupied by the signal VID of the video signal B continues to the end of the longest audio signal related to the video signal B.

As explained above the video and audio signals to be transmitted are allotted and the program materials are edited and once recorded. The recorded program materials are repeatedly reproduced and the reproduced signals are transformed in the transmitting apparatus and then the transformed signals are transmitted to the receivers. FIG. 26 illustrates the content of the transmitted signals. In the signal table S-ROW there is newly provided⑦C code for controlling the program proceeding. When C=0, the display is completed by reproducing the related program material having a label LBL=$i$, but when C=1, immediately after the display of the related program material has been completed, a next program material having a label LBL=$i$+1 is automatically displayed. When the code C of LBL=1 and LBL=2 is set to C=1, the program materials (LBL=1, LBL=2 and LBL=3) are automatically displayed in succession. This is apparently equivalent to the fact that the program material (LBL=1) shown in FIG. 24a is displayed. The code C is transmitted in CNT shown in FIG. 22d.

Next successive operations for selectively displaying the program materials (LBL=1, LBL=2 and LBL=3) at the receiver end will be explained.

Firstly it is assumed that the program material (LBL=1) is to be selected. The LBL=1 in the signal table S-ROW is collated and the signal table S-ROW of LBL=1 is extracted. Next③VID=10 in the extracted signal S-ROW is read out and①VID=10 added to the video signals is collated. The video signal having the corresponding①VID=10 is extracted and displayed by means of the video buffer memory. For the audio signal,④ACH=7 in the extracted S-ROW is read out and is collated with the audio signal⑥STX. When⑥STX=7 is detected, the audio signal $a_1$ transmitted through the audio channel 7 is reproduced and supplied to the speaker. Immediately after the start signal STX=7 has been detected, the collation of the audio end signal⑥ ETX is started. When the signal⑥ETX=7 is detected, the signal table S-ROW of LBL=1+1=2 is extracted, because the code⑦C in S-ROW of LBL=1 is⑦C=1. For②LBL=2, the video and audio signals are selectively extracted and reproduced in the same manner as explained above with respect to the program material (LBL=1). Since the end point of the audio signal $a_1$ of the program material (LBL=1) coincides with the start point of the audio signal $a_2$ of the program material (LBL=2), the audio signal $a_1$ and $a_2$ are continuously reproduced without interruption. In this manner the program materials (LBL=2 and LBL=3) are automatically displayed in succession. The code C of②LBL=3 is C=0, and thus the display is ended at the program material (LBL=3).

If the program material (LBL=4) is selected, the video signal B and the audio signal $b_1$, $b_2$ and $b_3$ are extracted and displayed as shown in FIG. 26. In FIG. 26 the program material (LBL=4) is selected at the master frame $MF_{j+2}$ and at this master frame $MF_{j+2}$ the program material (LBL=2) can be also selected. Thus it is possible to simultaneously display the program materials (LBL=2 and LBL=4) at different receivers.

As explained above the same video signal or the same audio signal may be commonly utilized for different programs. If the same audio signal is used commonly, the same audio channel number④ACH may be inserted in the signal tables S-ROW of program materials which utilize the same audio signal.

There are different types of program materials, that is program materials consisting of independent video and audio signals, program materials utilizing the same video signal or the same audio signals, program materials including only the video signals or the audio signals and dummy program materials having no video or audio signals.

In the signal table of program materials comprising only the video signals there may be included an audio channel number except for the channels A—CH=0 to A—CH=$n$, which does not actually exist. Similarly in the signal table of program materials having only the audio signals there may be denoted a video identification code other than VID=0 to VID=$m$, which does not actually exist. In the dummy program materials comprising neither the video signal nor the audio signal dummy audio channel numbers other than 0 to $n$ may be inserted in ACH and dummy video identification signals other than 0 to $m$ may be inserted in VID. The dummy program materials may be utilized to form intentionally vacancies in the programs. For example in a conversation studying apparatus it is necessary to provide poses for given time lengths after a teacher speaks an original language. In such a case the poses may be constituted by the dummy program materials. By this measure the transmission efficiency becomes high, because the dummy program materials do not occupy the transmission channels.

The dummy program materials can be treated in the same manner as the actual program materials. That is to say the allocation of the dummy audio channel numbers are effected for n+$\alpha$ to n+$\beta$ as shown in FIG. 25 and the signal table S-ROW and the audio start and stop signals are formed and further in the transmitting apparatus these signal codes are converted just like as the code signals of the actual program materials.

The present invention is not limited to the embodiments described above and many modifications may be effected. For example, in the transmission system for transmitting all of the information signals and the control signals in a given time period, each terminal receiver may comprise a memory for storing the transmitted signals of said given time period and desired information signals may be selectively reproduced under the control of the control signal. In such a case the construction of the terminal receiver becomes complicated, because each terminal receiver has to comprise the memory of rather large capacity. In order to avoid such a disadvantage there may be provided a common head end at the receiver end and a plurality of receivers are connected to the head end. The head end comprises the memory for storing the transmitted signals in the given time period. In this case the information signals and the control signal stored in the memory in the head end are repeatedly reproduced and transmitted to each terminal receiver. Moreover there may be provided a two-way transmission path between the head end and each terminal receiver. In such a case desired information signal may be selectively transmitted from the head end to each terminal receiver.

In the above embodiments the video and/or audio signals are transmitted through a single transmission path, but for example in case of adopting CATV system having a plurality of television channels, an FM band and a data transmission channel, the video and audio signals may be transmitted through one or more television channels and the control signal may be transmitted through the data transmission channel. Moreover the video and/or audio signals may be transmitted as a frequency division multiplexed signals.

What is claimed is:

1. A signal transmission system for transmitting a plurality of programmed information signals composed of audio signals each having an arbitrary time length and still picture video signals each included within a television frame period through a plurality of transmission channels, comprising at a transmitter end:
    an information signal source for producing said audio and still picture video signals;
    multiplexing means for arranging said audio signals to form a single signal chain, dividing the signal chain into a number of audio signal portions each having a given time period, and allocating each of the audio signal portions into each of a plurality of audio transmission channels;
    means for adding a video identification code to each of the still picture video signals in a vertical blanking period of a related television frame period;
    means for forming a plurality of control code words each of which includes an index control code indicating an index of an information program composed of one or more still picture video signals and one or more audio signals; and a transmission channel control code having a first control code for indicating one or more number codes of one or more audio channels through which said one or more audio signals denoted by said index control code are transmitted and a second control code for indicating one or more video identification codes of one or more still picture video signals denoted by said index control code;
    means for allocating the control code words into at least one of said transmission channels and inserting them immediately before points of transition of the information signals; and
    means for repeatedly transmitting said information signals and control code words at said given time period; and at a receiver end:
    means for producing said index control code having an index of a desired information program to be reproduced;
    means for detecting the first control code for denoting one or more audio transmission channels through which one or more audio signals composing said desired information program are transmitted and the second control code for denoting one or more video identification codes of one or more still picture video signals composing said desired information program together with said audio signals; and
    means for extracting said desired audio and still picture video signals on the basis of the detected transmission channel control code.

2. A signal transmission system as claimed in claim 1, wherein the control code words are transmitted in at least one of the audio channels.

3. A signal transmission system as claimed in claim 1, wherein said signal transmission system further comprises means for transmitting in one or more audio channels transition control codes indicating transitions of the video and audio signals denoted by the index control code.

4. A signal transmission system as claimed in claim 1, wherein the control code words are transmitted in the vertical blanking periods of the television frame periods of the still picture video signals.

5. A signal transmission system as claimed in claim 4, including means for alternating transmitting said still picture video signals and audio signals through the same transmission path for given periods.

6. A signal transmission system as claimed in claim 5, wherein said signals are time division multiplexed signals.

7. A signal transmission system as claimed in claim 6, wherein said time division multiplexed audio signals are pulse code modulated signals.

8. A signal transmission system as claimed in claim 7, including a plurality of PCM audio channels, means for providing a control code indicating start and end timings of the pulse code modulated audio signals and which is composed of a binary code indicating a number code of a PCM audio channel into which a PCM audio signal corresponding to said control code is allocated and means for transmitting said control code in at least one given time slot on said audio channels in which said PCM audio signals are transmitted, 9. A signal transmission system as claimed in claim 5, wherein said audio signals are frequency division multiplexed signals.

10. A signal transmission system as claimed in claim 5, wherein the transitions of the audio signals are effected at sectioning points of given time intervals equal to an integer multiple of a given repetition period at which the still picture video signals and the audio signals are alternatively transmitted.

11. A signal transmission system as claimed in claim 10, wherein each control code word indicating transition timings of the audio signals is inserted in each audio channel frame composed in said given repetition periods.

12. A transmitter for transmitting a plurality of programmed information signals composed of audio signals each having an arbitrary time length and still picture video signals each included within a television frame period through a plurality of transmission channels, comprising:

an information signal source for producing said audio and still picture video signals;

multiplexing means for arranging said audio signals to form a single signal chain, dividing the signal chain into a number of audio signal portions each having a given time period, and allocating each of the audio signal portions into each of a plurality of audio transmission channels;

means for adding a video identification code to each of the still picture video signals in a vertical blanking period of a related television frame period;

means for forming a plurality of control code words each of which includes an index control code indicating an index of an information program composed of one or more still picture video signals and one or more audio signals; and a transmission channel control code having a first control code for indicating one or more number codes of one or more audio channels through which said one or more audio signals denoted by said index control code are transmitted and a second control code for indicating one or more video identification codes of one or more still picture video signals denoted by said index control code;

means for allocating the control code words into at least one of said transmission channels and inserting them immediately before points of transition of the information signals; and means for repeatedly transmitting said information signals and control code words at said given time period.

13. A receiver for receiving a plurality of programmed information signals composed of audio signals each having an arbitrary time length and still picture video signals each included within a television frame period through a plurality of transmission channels; and for receiving a plurality of control code words each of which includes an index control code indicating an index of an information program composed of one or more still picture video signals and one or more audio signals, and a transmission channel control code having a first control code for indicating one or more number codes of one or more audio channels through which said one or more audio signals denoted by said index control code are transmitted and a second control code for indicating one or more video identification codes of one or more still picture video signals denoted by said index control code, the receiver comprising:

a. means for producing said index control code having an index of a desired information program to be reproduced;

b. means for detecting the first control code for denoting one or more audio transmission channels through which one or more audio signals composing said desired information program are transmitted and the second control code for denoting one or more video identification codes of one or more still picture video signals composing said desired information program together with said audio signals; and c. means for extracting said desired audio and still picture video signals on the basis of the detected transmission channel control code.

* * * * *